(12) United States Patent
Ueda et al.

(10) Patent No.: US 8,207,922 B2
(45) Date of Patent: *Jun. 26, 2012

(54) LIQUID CRYSTAL DISPLAY

(75) Inventors: Kazuya Ueda, Kawasaki (JP); Tsuyoshi Kamada, Kawasaki (JP); Hidefumi Yoshida, Kawasaki (JP); Yoshio Koike, Kawasaki (JP); Kenji Okamoto, Kawasaki (JP)

(73) Assignee: AU Optronics Corporation, Hsin-Chu (TW)

( * ) Notice: Subject to any disclaimer, the term of this patent is extended or adjusted under 35 U.S.C. 154(b) by 841 days.

This patent is subject to a terminal disclaimer.

(21) Appl. No.: 12/263,965

(22) Filed: Nov. 3, 2008

(65) Prior Publication Data

US 2009/0073097 A1    Mar. 19, 2009

Related U.S. Application Data

(62) Division of application No. 10/890,977, filed on Jul. 14, 2004, now Pat. No. 7,466,295.

(30) Foreign Application Priority Data

Feb. 24, 2004  (JP) ................................. 2004-047677

(51) Int. Cl.
*G09G 3/36* (2006.01)

(52) U.S. Cl. ........... 345/87; 349/156; 349/102; 349/142

(58) Field of Classification Search ............. 345/87; 349/156, 102, 142
See application file for complete search history.

(56) References Cited

U.S. PATENT DOCUMENTS

| | | | |
|---|---|---|---|
| 7,023,516 B2 | 4/2006 | Yoshida et al. | |
| 7,075,600 B2 | 7/2006 | Song et al. | |
| 7,224,421 B1 | 5/2007 | Takeda et al. | |
| 2004/0090582 A1 | 5/2004 | Ikeda et al. | |
| 2006/0103799 A1 | 5/2006 | Ikeda et al. | |

FOREIGN PATENT DOCUMENTS

| | | |
|---|---|---|
| EP | 1 621 923 | 2/2006 |
| JP | 64-50019 | 2/1989 |
| JP | 7-270822 | 10/1995 |
| JP | 2947350 | 7/1999 |
| JP | 11-242225 | 9/1999 |
| JP | 2002-107730 | 4/2002 |
| JP | 2003-43489 | 2/2003 |
| KR | 1999-6951 | 1/1999 |

OTHER PUBLICATIONS

Office Action dated Mar. 30, 2010 issued in corresponding Japanese Patent Application No. 2004-047677 with English translation.

*Primary Examiner* — Seokyun Moon
(74) *Attorney, Agent, or Firm* — CKC & Partners Co., Ltd.

(57) ABSTRACT

The liquid crystal display comprises a first substrate including a first pixel electrode and a second pixel electrode, a second substrate with an opposed electrode formed on, and a liquid crystal layer sealed between the first substrate and the second substrate. The thickness $d_1$ of the liquid crystal layer on the first pixel electrode in the first pixel region is larger than the thickness $d_2$ of the liquid crystal layer on the second pixel electrode in the second pixel region. The first pixel region includes a first partial region and a second partial region where the threshold voltage is higher than in the first partial region. The second pixel region includes a third partial region and a fourth partial region where the threshold voltage is higher than in the third partial region. The threshold voltage in the first partial region and the threshold voltage in the third partial region are equal to each other, and the threshold voltage in the second partial region and the threshold voltage in the fourth partial region are equal to each other. Thus, it is possible to prevent large changes in the chromaticity due to gradation and visual angle changes, which lead to the prevention of the occurrence of the coloring. Thus, it is possible to provide a liquid crystal display having good display quality.

13 Claims, 16 Drawing Sheets

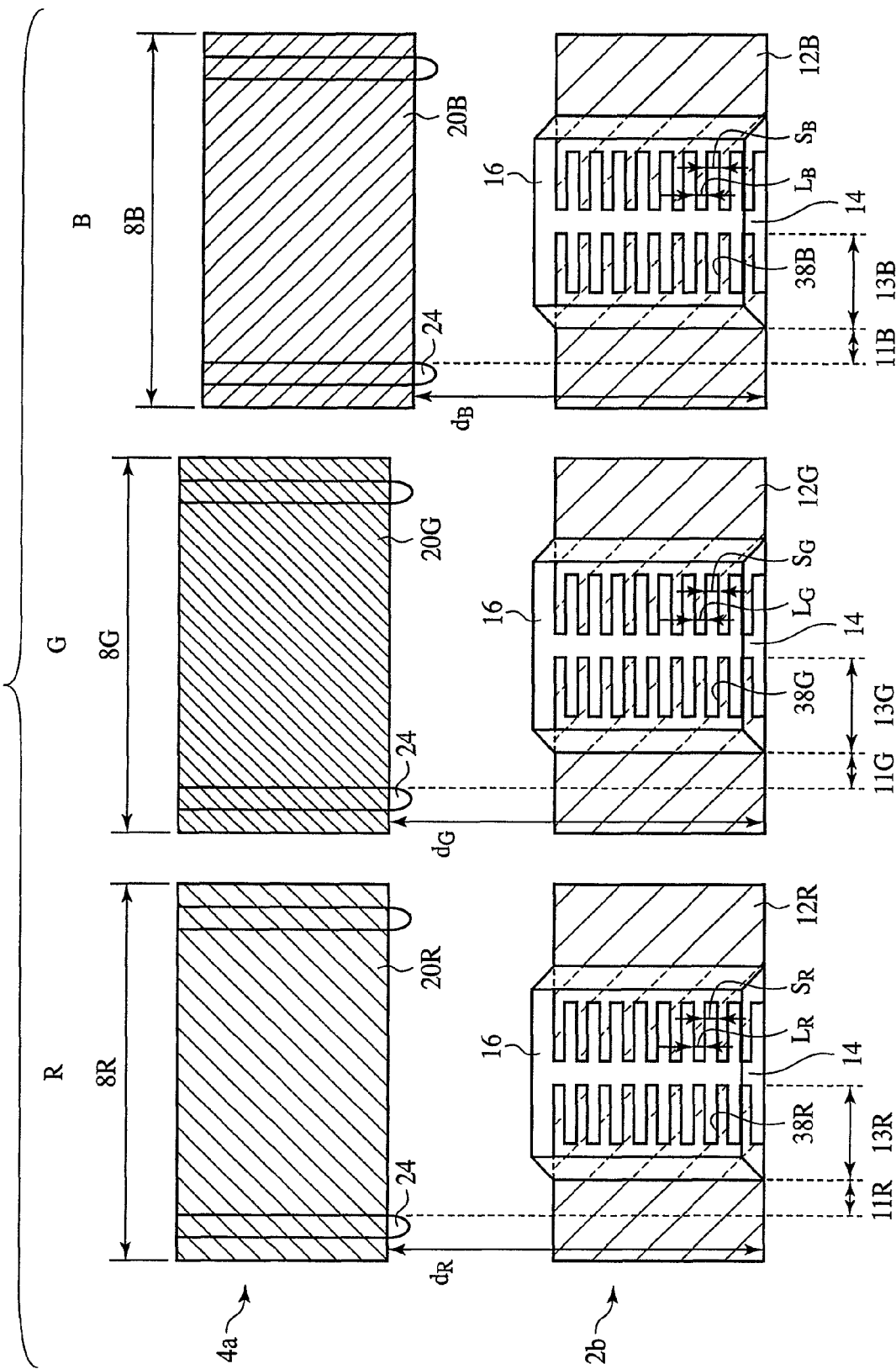

LIQUID CRYSTAL DISPLAY

CROSS-REFERENCE TO RELATED APPLICATION

This application is a Division of application Ser. No. 10/890,977, filed Jul. 14, 2004, which is based upon and claims priority of Japanese Patent Application No. 2004-47677, filed on Feb. 24, 2004, the contents being incorporated herein by reference.

BACKGROUND OF THE INVENTION

The present invention relates to a liquid crystal display, more specifically a liquid crystal display which can have display quality improved.

MVA (Multi-domain Vertical Alignment) type liquid crystal displays combine the vertical alignment technique, which realizes high contrast and high-speed response and the multi-domain technique, which realizes large viewing angle.

In the MVA type liquid crystal display, alignment control blank patterns or alignment control structures are disposed respectively on a TFT substrate and a CF substrate. Alignment directions of the liquid crystal molecules are controlled by the alignment control blank pattern or alignment control structure. The MVA type liquid crystal display does not require rubbing, which is a large factor for lowering the productivity, and can attain high productivity.

Following references disclose the background art of the present invention.
[Patent Reference 1]
Specification of Japanese Patent No. 2947350
[Patent Reference 2]
Specification of Japanese Patent Application Unexamined Publication No. 2002-107730
[Patent Reference 3]
Specification of Japanese Patent Application Unexamined Publication No. 2003-43489

SUMMARY OF THE INVENTION

According to one aspect of the present invention, there is provided a liquid crystal display comprising: a first substrate including a first pixel electrode and a second pixel electrode; a second substrate with an opposed electrode formed on, the opposed electrode opposing to the first pixel electrode and the second pixel electrode; and a liquid crystal layer sealed between the first substrate and the second substrate, a thickness of the liquid crystal layer in a first pixel region on the first pixel electrode being larger than a thickness of the liquid crystal layer in a second pixel region on the second pixel electrode; the first pixel region including a first partial region, and a second partial region where a threshold voltage is higher than in the first partial region, and the second pixel region including a third partial region and a fourth partial region where a threshold voltage is higher than in the third partial region, and the threshold voltage in the first partial region and the threshold voltage in the third partial region being equal to each other, and the threshold voltage in the second partial region and the threshold voltage in the fourth partial region being equal to each other.

According to the present invention, a lower threshold region and a higher threshold region are present between the alignment control blank pattern and the alignment control structure, whereby changes of the transmittivity for applied voltage changes can be gentle. Thus, the present invention can prevent the transmissivity given when the screen is observed obliquely from being higher than the transmissivity given when the screen is observed at the front, whereby the brightness given when the screen is observed obliquely from being higher than the brightness given when the screen is observed at the front. Furthermore, according to the present invention, the parameters of the alignment control structure, the alignment control blank pattern and the electric field control structures are set to be proportional with the respective cell-gaps, whereby although the cell-gap in the first pixel region and the cell-gap in the second pixel region are different from each other, the threshold voltage in the higher threshold region of the first pixel region and the threshold voltage in the higher threshold region of the second pixel region can be made substantially equal to each other, and the threshold voltage in the lower threshold region of the first pixel region and the threshold voltage in the lower threshold region of the second pixel region can be made substantially equal to each other. Thus, the present invention can prevent large changes in the chromaticity due to gradation and visual angle changes, which lead to the prevention of the occurrence of the coloring. Thus, the present invention can provide a liquid crystal display having good display quality.

According to the present invention, the parameters of the electric field control blank pattern are suitably set in accordance with the cell-gaps, whereby although the cell-gap differs between the first pixel region and the second pixel region, the threshold voltage in the higher threshold region of the first pixel region and the threshold voltage in the higher threshold region of the second pixel region can be made substantially equal to each other, and the threshold voltage in the lower threshold region of the first pixel region and the threshold voltage in the lower threshold region of the second pixel region can be made substantially equal to each other. Thus, the present invention can prevent the occurrence of the phenomena that the brightness given when observed obliquely is higher than the brightness given when observed at the front while preventing the occurrence of the coloring phenomena.

According to the present invention, the parameters of the electric field control blank pattern is suitably set in accordance with the cell-gap, whereby even in the case that the parameters of the electric field control blank pattern, the electric field control structure and the alignment control structure are set to be equal to one another in the respective pixel regions, the threshold voltages in the higher threshold regions of the respective pixel regions can be made substantially equal to each other. Thus, the present invention can prevent the brightness given when observed obliquely higher than the brightness given when observed at the front while preventing the occurrence of the coloring phenomena. According to the present invention, the parameters of the electric field control structure, the alignment control structure, etc. are set to be equal to one another among the respective pixel regions, whereby the fabrication process can be simplified. According to the present invention, the parameters of the electric field control structure, the alignment control structure, etc. are set to be equal to one another among the respective pixel regions, whereby the response speed is prevented from varying among the respective pixel regions.

According to the present invention, in a pixel region where the electric field control blank pattern must be formed narrow, the electric field control blank pattern is not intentionally formed, whereby the occurrence of disuniform displays, etc. can be prevented.

According to the present invention, the cell-gap in the first pixel region and the cell-gap in the third pixel region are set to be equal to each other, whereby the structure can be simpli-

BRIEF DESCRIPTION OF THE DRAWINGS

FIG. 16 is a perspective view of the liquid crystal display according to Control 2.

DETAILED DESCRIPTION OF THE INVENTION

Figure 9:
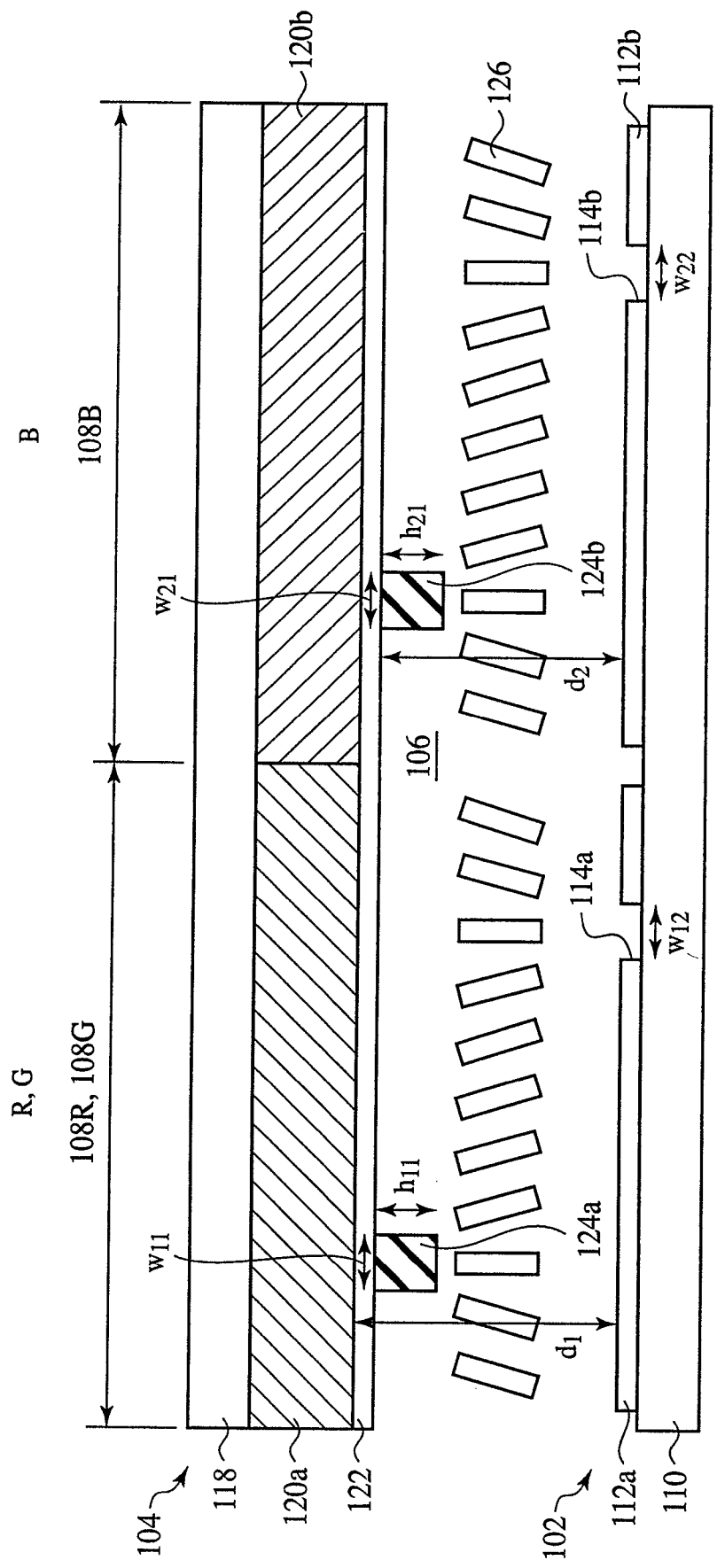
FIG. 9 is a sectional view of the proposed liquid crystal display.

A proposed MVA type liquid crystal display will be explained with reference to FIG. 9. FIG. 9 is a sectional view of the proposed liquid crystal display. On the left side of the drawing, an R (red color) pixel region 108R and a G (green color) pixel region 108G are illustrated, and a B (blue color) pixel region 108B is illustrated on the right side of the drawings.

First, a TFT substrate 102 will be explained. As illustrated in FIG. 9, pixel electrodes 112a, 112b are formed on a glass substrate 110. Alignment control blank patterns (blank of the electrodes) 114a, 114b are formed in the pixel electrodes 112a, 112b. The widths $w_{12}$, $w_{22}$ of the alignment control blank patterns 114a, 114b are both set at 10 µm. An alignment film (not shown) is formed on the glass substrate 110a with the pixel electrodes 112a, 112b formed on. Thus, the TFT substrate 102 is formed.

Next, a CF substrate 104 will be explained. A color filter layer 120a, 120b is formed on the underside of the glass substrate 118. The thickness of the color filter layer 120a, 120b is set uniform in all the R, G and B pixel regions 108R, 108G, 108B. Alignment control structures 124a, 124b are formed on the underside of the color filter layer 120a, 120b. The widths $w_{11}$, $w_{21}$ of the alignment control structures 124a, 124b are both set at 10 µm. The heights $h_{11}$, $h_{21}$ of the alignment control structures 124a, 124b are both set at, e.g., 1.2 µm.

A liquid crystal 106 is sealed between the TFT substrate 102 and the CF substrate 104. The liquid crystal 106 is a nematic liquid crystal, which has negative dielectric anisotropy. The thickness of the liquid crystal layer 106, i.e., the cell-gap $d_1$, $d_2$ is set at, e.g., 4.0 µm uniformly in all the R, the G and the B pixel regions 108R, 108G, 108B.

Thus, the proposed MVA type liquid crystal display is constituted.

In the MVA type liquid crystal display, the alignment control blank pattern 114 and the alignment control structure 124 disposed respectively on the TFT substrate 102 and the CF substrate 104 control the alignment direction of the liquid crystal molecules 126. The MVA type liquid crystal display does not require rubbing, which is a large factor for lowering the productivity, and can attain high productivity.

However, in the proposed MVA type liquid crystal display illustrated in FIG. 9, it has been often that the brightness of images observed obliquely is higher than the brightness of the images observed at the front. Thus, the proposed liquid crystal display does not have always good display quality.

An object of the present invention is to provide a liquid crystal display which can have the display quality improved.

A FIRST EMBODIMENT

Figure 12:
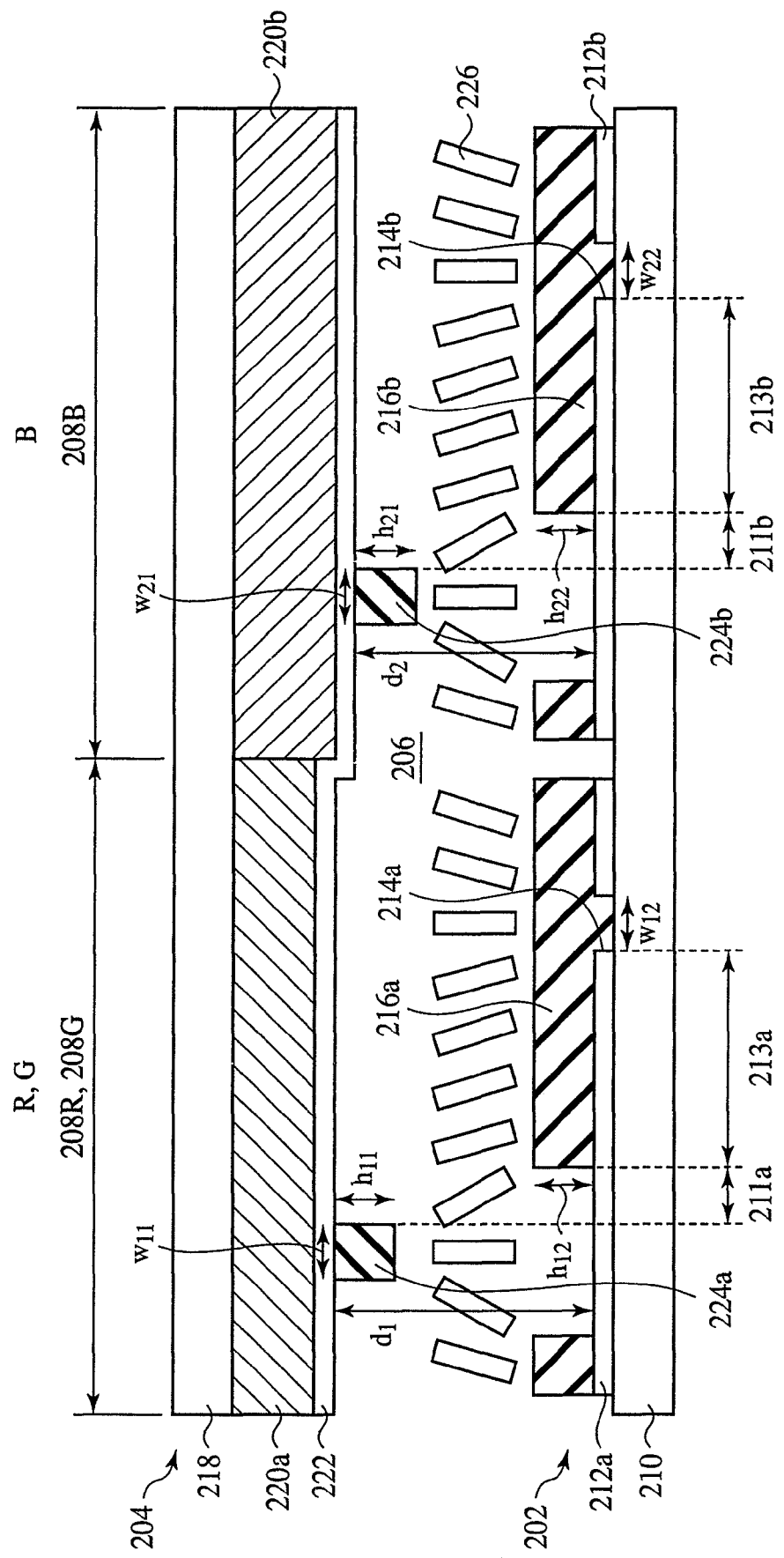
FIG. 12 is a sectional view of another proposed liquid crystal display.

Before the liquid crystal display according to a first embodiment of the present invention is explained, another proposed liquid crystal display will be explained. FIG. 12 is a sectional view of said another proposed liquid crystal display. In FIG. 12, an R pixel region 208R and a G pixel region 208G are illustrated on the left side of the drawing, and the right side of the drawing, a B pixel region 208B is illustrated. The R pixel region 208R and the G pixel region 208G have the same constitution except that a color filter layer 220 is different in color between the R pixel region 208R and the G pixel region 208G, and are not separately illustrated but illustrated in one and the same drawing.

First, a TFT substrate 202 will be explained. Pixel electrodes 212a, 212b are formed on a glass substrate 210. Alignment control blank patterns 214a, 214b, i.e., slits are formed respectively in the pixel electrodes 212a, 212b, the alignment control blank pattern being a region where ITO is not formed in the pixel electrode. The widths $w_{12}$, $w_{22}$ of the alignment control blank patterns 214a, 214b are both set at 10 µm. Electric field control structures 216a, 216b of, e.g., a dielectric layer are formed on the pixel electrodes 212a, 212b with the alignment control blank patterns 214a, 214b formed in. The heights $h_{11}$, $h_{12}$ of the electric field control structures 216a, 216b are both set at 1.0 µm. An alignment film (not shown) is formed on the glass substrate 210 with the electric field control structures 216a, 216b, etc. formed on. Thus, the TFT substrate 202 is formed.

Then, a CF substrate 204 will be explained. A color filter layer 220a, 220b is formed on the underside of the glass substrate 218. The thickness of the color filter layer 220a in the R and the G pixel regions is smaller by 1.0 µm than the thickness of the color filter layer 220b in the B pixel region. An opposed electrode 222 is formed on the underside of the color filter layer 220. Respective alignment control structures 224a, 224b are formed on the underside of the opposed electrode 222. The widths $w_{11}$, $w_{21}$ of the alignment control structures 224a, 224b are both set at 10 µm. The height $h_{11}$, $h_{12}$ of the alignment control structures 224a, 224b are both set at 1.5 µm.

A liquid crystal 206 is sealed between the TFT substrate 202 and the CF substrate 204. The thickness of the liquid crystal layer 206 in the R and the G pixel regions 208R, 208G, i.e., the cell-gap $d_1$ is set at 5.0 µm. The cell-gap $d_2$ in the B pixel region 208B is set at 4.0 µm. The cell-gap $d_1$ in the R and the G pixel regions 208R, 208G and the cell-gap $d_2$ in the B pixel region 208B are different from each other so that the difference in $\Delta n \cdot d/\lambda$ among the respective R, the G and the B pixel regions 208R, 208G, 208B is made small. $\Delta n$ indicates a diffractive index anisotropy, d indicates a cell-gap, and $\lambda$ indicates a wavelength of light. In order to make the difference in $\Delta n \cdot d/\lambda$ among the respective R, the G and the B pixel regions 208R, 208G, 208B small, it is preferable to set the cell-gap in the R pixel region 208G, the cell-gap in the G pixel region 208G and the cell-gap in the B pixel region 208B at optimum values. Here, to simplify the structure, the cell-gap in the R pixel region 208R and the cell-gap in the G pixel region 208G are set to be the same.

Thus, said another proposed liquid crystal display is constituted.

In said another proposed liquid crystal display, regions 211a, 211b where the electric field control structures 216a, 216b are not formed and regions 213a, 213b where the electric field control structures 216a, 216b are not formed are present between the alignment control blank patterns 214a, 214b and the alignment control structures 224a, 224b. The threshold voltage of in the regions 213a, 213b where the alignment control structures 216a, 216b are formed is higher than the threshold voltage in the regions 211a, 211b where the alignment control structures 216a, 216b are not formed. The T-V characteristics differ between the regions (higher threshold regions) 213a, 213b, where the threshold voltage is relatively high and the regions (lower threshold regions) 211a, 211b, where the threshold voltage is relatively lower. The threshold voltage means a voltage at which the liquid crystal molecules start to tilt while a voltage applied between the pixel electrode 12 and the opposed electrode 22 is being gradually increased.

Figure 10:
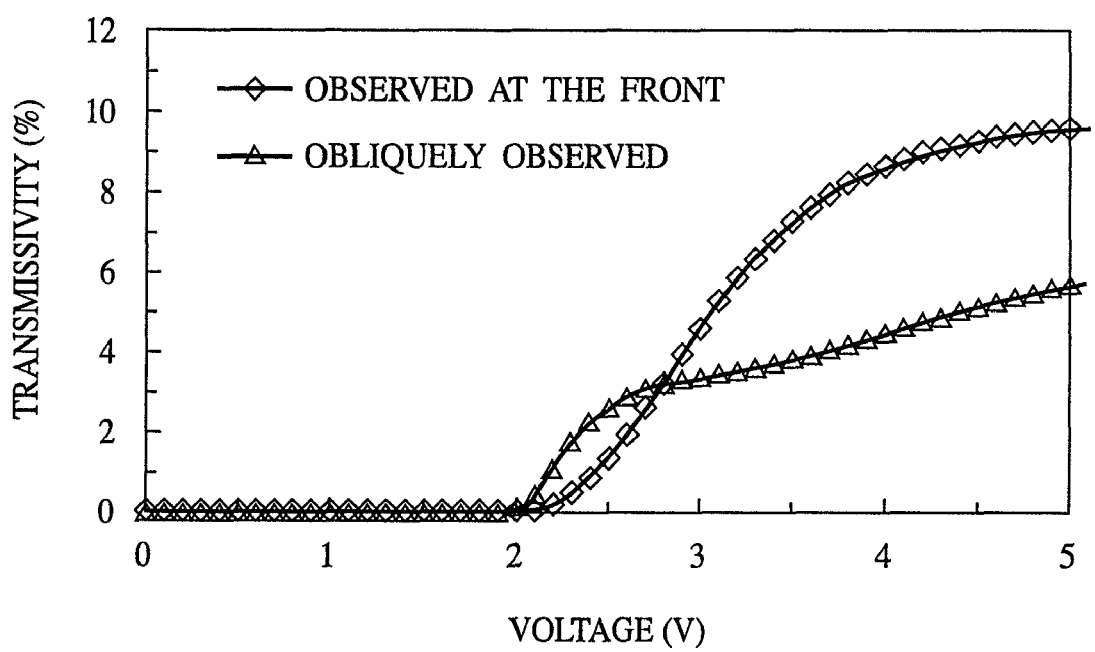
FIG. 10 is a graph of the T-V characteristics of the proposed liquid crystal display.
Figure 13:
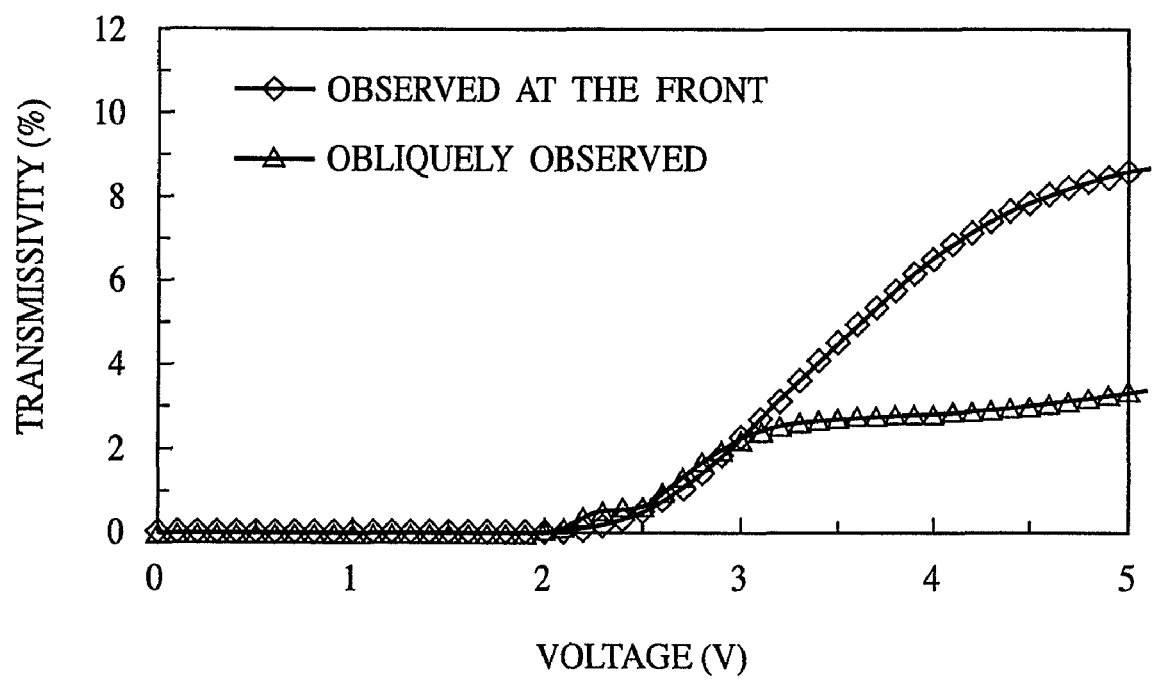
FIG. 13 is a graph of the T-V characteristics of said another proposed liquid crystal display.

FIG. 10 is a graph of the T-V characteristics (voltage-transmittivity characteristics) of the proposed liquid crystal display. FIG. 13 is a graph of the T-V characteristics of said another proposed liquid crystal display. In FIGS. 10 and 13, the applied voltages are taken on the horizontal axis, and on the vertical axis the transmittivities are taken. The ◊ marks indicate the case where the screen was observed at the front, and the Δ marks indicate the case where the screen was observed obliquely. When the screen was observed obliquely, the polar angle of the view point was 60 degrees, and the screen was observed from above the screen. The polar angle means an angle to a normal to the substrate surface.

As seen in FIG. 10, the proposed liquid crystal display has a voltage range where the transmittivity is higher when observed obliquely than at the front. Accordingly, the proposed liquid crystal display, the brightness of images observed obliquely is higher than the brightness of the images observed at the front.

The reason for the brightness being higher when observed obliquely than when observed at the front will be as follows. That is, a liquid crystal having negative dielectric anisotropy does not transmit light when a direction of a view point agrees with an angle of the longitudinal direction of the liquid crystal molecules, and as the angle of the direction of the view point to the longitudinal direction of the liquid crystal molecules is increased, the transmittivity increases. There are conditions under which θ' is larger than θ when an angle of a view point direction to a longitudinal direction of the liquid crystal molecules formed when the tilted liquid crystal molecules are observed at the front is θ, and an angle of a view point direction to a longitudinal direction of the liquid crystal molecules formed when the tilted liquid crystal molecules are observed obliquely is θ'. Under such conditions, the transmittivity given when observed obliquely is higher than the transmittivity given when observed at the front. A resultant phenomena is that the brightness given observed obliquely is higher than the brightness given when observed at the front.

In said another proposed liquid crystal display, however, as seen in FIG. 13, the transmittivity given when observed obliquely is prevented from being higher than the transmittivity given when observed at the front. Accordingly, in said another proposed liquid crystal display, the phenomena that the brightness given when observed obliquely is higher than the brightness given when observed at the front can be prevented.

The reason for said another proposed liquid crystal display being able to suppress the phenomena that the brightness given when observed obliquely is higher than the brightness given when observed at the front will be as follows. That is, the voltage applied between the pixel electrode 212 and the opposed electrode 222 is gradually increased, and when the voltage applied between the pixel electrode 212 and the opposed electrode 222 exceeds the threshold voltage of the lower threshold region 211, the liquid crystal molecules 226 in the lower threshold region 211 start to tilt. At this time, since the liquid crystal molecules 226 in the higher threshold region 213 do not tilt, the transmittivity increase for the applied voltage increase is relatively gentle. Then, when the voltage applied between the pixel electrode 212 and the opposed electrode 222 exceeds the threshold voltage of the higher threshold region 213, the liquid crystal molecules 226 in the higher threshold region 213 also start to tilt. Thus, in said another proposed liquid crystal display, in comparison with the proposed liquid crystal display, the transmittivity increase for the applied voltage increase can be gentle. Thus, the transmittivity increase for the applied voltage increase can be gentle both when observed at the front and when observed obliquely. Accordingly, much more increase of the transmittivity given when observed obliquely than given when observed at the front can be prevented, whereby the phenomena that the brightness given when observed obliquely is higher than the brightness given when observed at the front can be prevented.

However, in said another proposed liquid crystal display, the color balance among R, G and B has been often disturbed.

Figure 14:
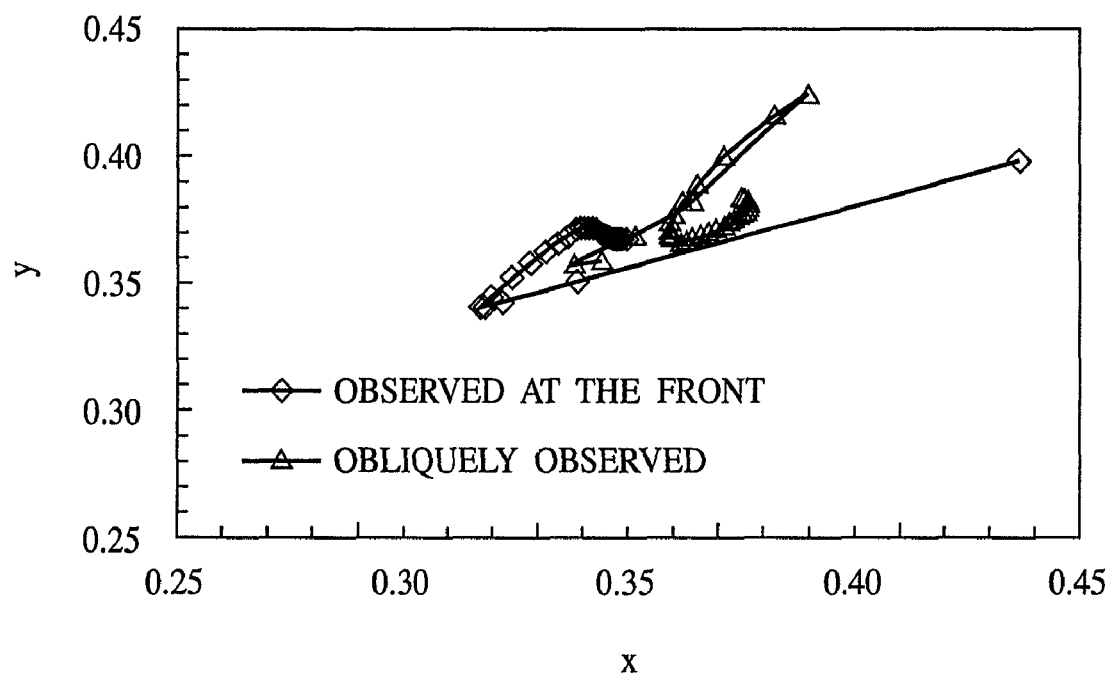
FIG. 14 is a graph of the gradation chromaticity change characteristics of said another proposed liquid crystal display.

FIG. 14 is a graph of the gradation chromaticity change characteristics of said another proposed liquid crystal display. The ◊ marks indicate the case where the screen was observed at the front, and the Δ marks indicate the case where the screen was observed obliquely. In measuring the gradation chromaticity change characteristics, the gradation was changed gradually from black to white, and the xy chromaticities (x,y) at each gradation were given. When the screen was observed, the polar angle of the view point was 60 degrees, and the screen was observed from above.

As seen in FIG. 14, in said another proposed liquid crystal display, the chromaticity is largely changed as the gradation changes, and the color balance is much disturbed. The differences in the chromaticity between the case where the screen was obliquely observed and the case where the screen was observed at the front are considerably large.

Accordingly, said another proposed liquid crystal display has the phenomena that a display which is originally to be displayed in a achromatic color is displayed in a chromatic color. Such phenomena is called coloring.

The coloring taking place in said another proposed liquid crystal display will be because the parameters of the alignment control structures 224a, 224b, the alignment control blank patterns 214a, 214b and the electric field control structures 216a, 216b are set to be equal to one another although the pixel regions 208R, 208G and region 208B have the cell-gaps $d_1$, $d_2$ which are different from each other. That is, in said another proposed liquid crystal display, the cell-gap $d_1$ in the pixel regions 208R, 208G is larger than the cell-gap $d_2$ in the pixel region 208B, but the heights $h_{12}$, $h_{22}$ of the electric field control structures 216a, 216b are equal to each other. This makes a voltage applied to the liquid crystal 206 in the higher threshold region 213a higher than the voltage applied to the liquid crystal 206 in the higher threshold region 213b in said another proposed liquid crystal display. This is a factor for making the threshold voltages in the higher threshold regions 213a, 213b of each pixel regions 208 different from each other. In said another proposed liquid crystal display, although the cell-gap $d_1$ in the pixel regions 208R, 208G is larger than the cell-gap $d_2$ in the pixel region 208B, the heights $h_{11}$, $h_{21}$ and the widths $w_{11}$, $w_{21}$ of the alignment control structure 224 and the widths $w_{12}$, $w_{22}$, etc. of the alignment control blank pattern 214 are equal to each other. Accordingly, the alignment control force to be applied to the liquid crystal molecules 226 varies among the respective pixel regions 208. This is also a factor for the threshold voltages in the respective pixel regions 208 differ from one another.

The inventors of the present application have made earnest studies and had an idea that the parameters of the alignment control structures 224a, 224b, the alignment control blank patterns 214a, 214b, the electric field control structures 216a, 216b, etc. are set in accordance with the cell-gaps d in the respective pixel regions 208. The parameters of the alignment control structures 224a, 224b, the alignment control blank patterns 214a, 214b, the electric field control structures 216a, 216b, etc. are set in accordance with the cell-gaps d in the respective pixel regions 208, whereby a threshold voltage is prevented from varying among the respective pixel regions 208, and accordingly, the color balance is kept from being disturbed with a result that the coloring phenomena is prevented.

Figure 1:
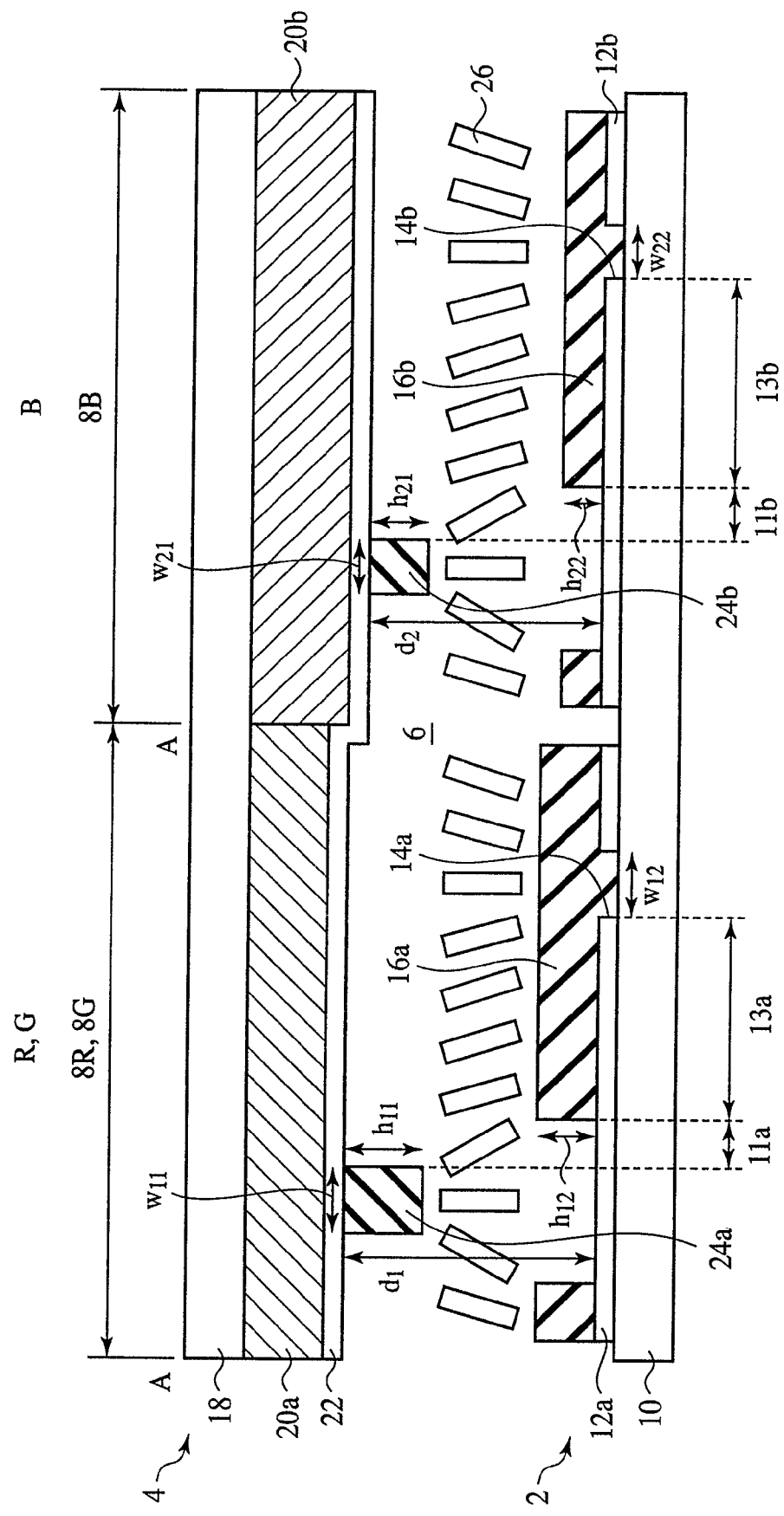
FIG. 1 is a sectional view of the liquid crystal display according to a first embodiment of the present invention.
Figure 2:
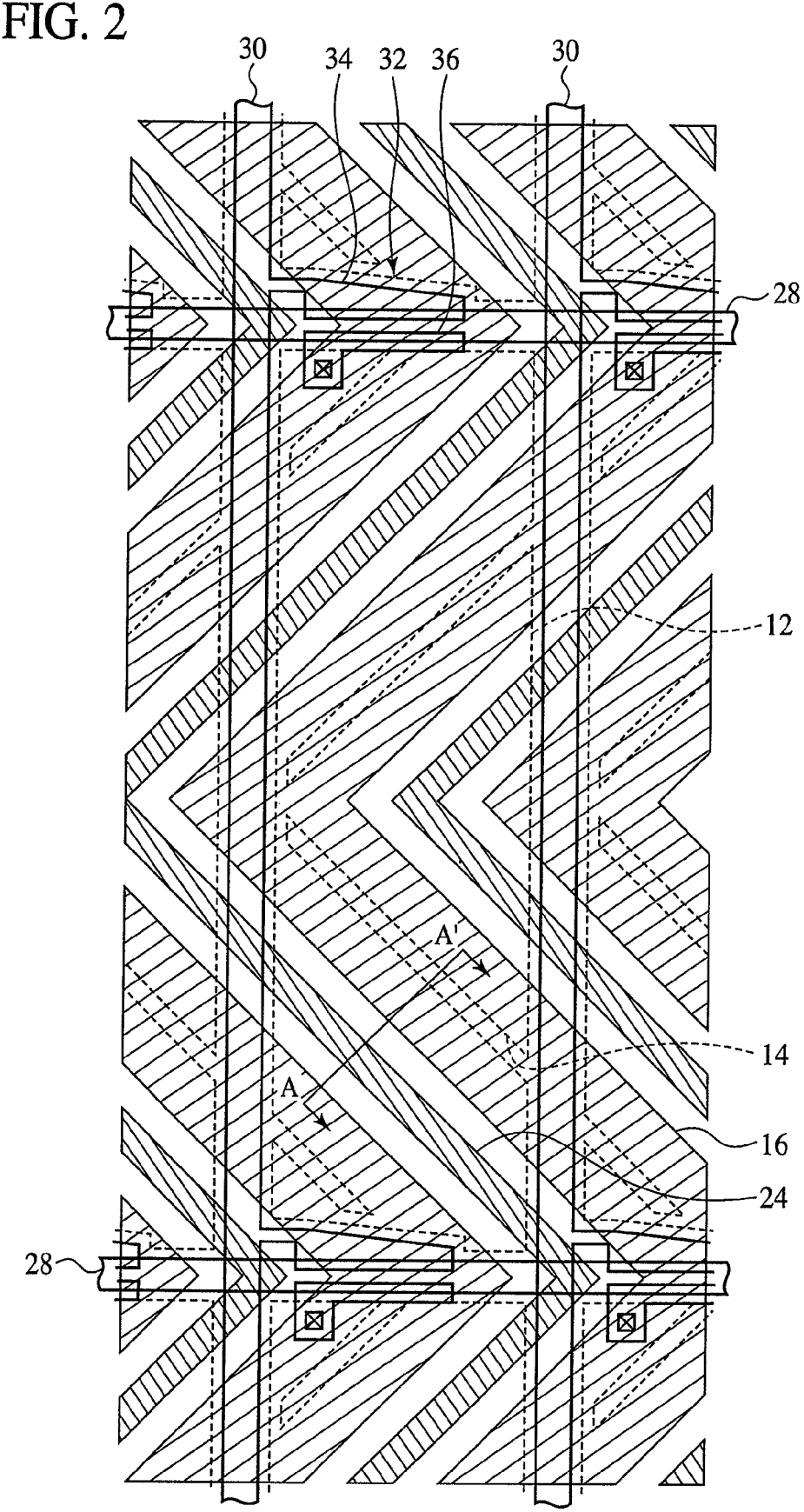
FIG. 2 is a plan view of the liquid crystal display according to the first embodiment of the present invention.

The liquid crystal display according to a first embodiment of the present invention will be explained with reference to FIGS. 1 to 4. FIG. 1 is a sectional view of the liquid crystal display according to the present embodiment. FIG. 2 is a plan view of the liquid crystal display according to the present embodiment.

The liquid crystal display according to the present embodiment comprises a TFT substrate 2 with pixel electrodes, etc. formed on, a CF substrate 4 with an opposed electrode opposed to the pixel electrodes, etc., and a liquid crystal 6 sealed between the TFT substrate 2 and the CF substrate 4.

In FIG. 1, on the left side of the drawing, an R (red color) pixel region and a G (green color) pixel region (a first pixel region) 8R, 8G are illustrated, and a B (blue color) pixel region (a second pixel region) 8B is illustrated on the right side of the drawing. The R pixel region 8R and the G pixel region 8G have the same constitution except that they are different in the color of a color filter layer 20, and they will be explained with reference to the drawing which does not illustrate them separately but illustrates together. In the R and the G pixel regions 8R, 8G, the thickness of the liquid crystal layer 6, i.e., the cell-gap $d_1$ is set at, e.g., 5.0 μm. In the B pixel region 8B, the cell-gap $d_2$ is set at, e.g., 4.0 μm.

The cell-gap $d_1$ in the R and the G pixel regions 8R, 8G is larger than the cell-gap $d_2$ in the B pixel region 8B, because the difference in Δn·d/λ among the R, the G and the B pixel regions 8 can be small.

To make smaller the difference in Δn·d/λ among the R, the G and the B pixel regions 8R, 8G, 8B, it is preferable the cell-gap in the R pixel region 8R, the cell-gap in the G pixel region 8G and the cell-gap in the B pixel region 8B are respectively set at optimum values. In the present embodiment, the cell-gap in the R pixel region 8R and the cell-gap in the G pixel region 8G are set to be equal to each other so as to make the structure simple.

First the TFT substrate 2 will be explained.

On the glass substrate 10 there are formed a plurality of gate bus lines 28 substantially in parallel with each other (see FIG. 2). A gate insulation film (not shown) is formed on the glass substrate 10 with the gate bus liens 28 formed on. On the glass substrate 10 with the gate insulation film, etc. formed on, a plurality of data bus lines 30 are formed, substantially orthogonally crossing the gate bus lines 28. TFTs (Thin-Film Transistors) 32 are formed near the intersections between the gate bus lines 28 and the data bus lines 30. The gate bus lines 28 functions as the gate electrodes of the TFTs 32. The source electrodes 34 of the TFT 32 are electrically connected to the data bus lines 30. The drain electrodes 36 of the TFTs 32 are connected to pixel electrodes 12a, 12b of ITO (Indium-Tin Oxide).

In the pixel electrodes 12a, 12b, respective alignment control blank patterns 14a, 14b, i.e., slits are formed. The alignment control blank patterns 14 are arranged generally zigzag (see FIG. 2). The alignment control blank patterns 14a, 14b are for controlling the alignment direction of the liquid crystal molecules 26 of the liquid crystal layer 6.

The width $w_{12}$ of the alignment control blank pattern 14a in the R and the G pixel regions 8R, 8G is set at, e.g., 12 μm. The width $w_{22}$ of the alignment control blank pattern 14b in the B pixel region 8B is set at, e.g., 10 μm. The ratio ($w_{12}/d_1$) of the width $w_{12}$ of the alignment control blank pattern in the R and the G pixel regions to the cell-gap $d_1$ therein is set to be substantially equal to the ratio ($w_{22}/d_2$) of the width $w_{22}$ of the alignment control blank pattern in the B pixel region to the cell-gap $d_2$ therein.

In the claims of the present application, to be equal contains not only to be perfectly equal, but also to be substantially equal.

The ratio ($w_{12}/d_1$) of the width $w_{12}$ of the alignment control blank pattern in the R and the G pixel regions and the ratio ($w_{22}/d_2$) of the width $w_{22}$ of the alignment control blank pattern in the B pixel region to the cell-gap $d_2$ therein are set to be substantially equal to each other for the following reason. That is, as the cell-gaps $d_1$, $d_2$ are larger, the alignment control force of the alignment control blank patterns 14a. 14b is more hindered from acting to the liquid crystal molecules 26. Accordingly, in the case that the cell-gap $d_1$ in the pixel regions 8R, 8G is larger than the cell-gap $d_2$ in the pixel region 8B, but the width $w_{12}$ of the alignment control blank pattern 14a and width $w_{22}$ of the alignment control blank pattern 14b are set to be equal to each other, the alignment of the liquid crystal molecules 26 are not easily controlled in the pixel regions 8R, 8G, where the cell-gap $d_1$ is larger, and on the other hand, in the pixel region 8B, where the cell-gap $d_2$ is smaller, the alignment of the liquid crystal molecules 26 is easily controlled. Then, a large difference in the threshold voltage between the R and the G pixel regions 8R, 8G and the B pixel region 8B is made, which leads to deterioration of the display quality. In the present embodiment, however, the width $w_{12}$ of the alignment control blank pattern 14a in the R and the G pixel regions 8R, 8G and the width $w_{22}$ of the alignment control blank pattern 14b in the B pixel region 8B are set to be proportional the cell-gaps $d_1$, $d_2$. The alignment control force of the alignment control blank patterns 14a, 14b is larger as the widths $w_{12}$, $w_{22}$ are larger. In the present embodiment, the widths $w_{12}$, $w_{22}$ of the alignment control blank patterns 14a, 14b are set corresponding to the cell-gaps $d_1$, $d_2$, whereby even when the cell-gap $d_1$ in the pixel regions 8R, 8G is set to be larger than the cell-gap $d_2$ in the pixel region 8B, it can be prevented that the liquid crystal molecules 26 in the pixel regions 8R, 8B, where the cell-gap $d_1$ is larger, are not easily aligned. Thus, according to the present embodiment, even when the cell-gap d is different among the respective pixel regions 8, the threshold voltages can be substantially equal to one another.

Electric field control structures 16a, 16b of, e.g., a dielectric layer is formed on the glass substrate 10 with the pixel electrodes 12a, 12b formed on. The electric field control structure 16b is arranged zigzag (see FIG. 2). The center line of the electric field control structures 16 substantially agrees with the center line of the alignment control blank patterns 14. The electric field control structures 16 control the electric fields applied to the liquid crystal molecules 26 to thereby control the threshold voltage. Of the regions between the alignment control blank patterns 14a, 14b and the alignment control structures 24a, 24b, the regions 13a, 13b where the electric field control structures 16a, 16b are formed are regions where the threshold voltage is relatively higher, i.e., higher threshold regions. Of the regions between the alignment control blank patterns 14a, 14b and the alignment control structures 24a, 24b, the regions 11a, 11b where the electric field control structures 16a, 16b are not formed, are region where the threshold voltage is relative low, i.e., lower threshold regions.

The height $h_{12}$ of the electric field control structure 16a in the R and the G pixel regions 8R, 8G is set at, e.g., 1 μm. The height $h_{22}$ of the electric field control structure 16b in the B pixel region 8B is set at, e.g., 0.8 μm. The ratio ($h_{12}/d_1$) of the height $h_{12}$ of the electric field control structure to the cell-gap $d_1$ in the R and the G pixel regions 8R, 8G and the ratio ($h_{22}/d_2$) of the height $h_{22}$ of the electric field control structure 16b to the cell-gap $d_2$ in the B pixel region 8B are set to be substantially equal to each other. The width of all the electric field control structures 16a, 16b is set at, e.g., 50 μm. The pitch of the electric field control structures 16a, 16b is set at, e.g., 70 μm.

The ratio of the height $h_{12}$ of the electric field control structure 16a to the cell-gap $d_1$ in the R and the G pixel regions and the ratio of the height $h_{22}$ of the electric field control structure 16b to the cell-gap $d_2$ in the B pixel region are set to be substantially equal to each other for the following reason. That is, in the regions where the electric field control structures 16a, 16b formed in, a voltage applied to the liquid crystal layer 6 is decreased by the electric field control structures 16a, 16b. Accordingly, in the case that the cell-gap $d_1$ in the pixel regions 8R, 8G is larger than the cell-gap $d_2$ in the pixel region 8B, but the height $h_{12}$ of the electric field control structure and the height $h_{22}$ of the electric field control structure are set to be equal to each other, a voltage applied to the liquid crystal layer 6 in the pixel regions 8R, 8G, where the cell-gap $d_1$ is larger, becomes higher than the voltage applied to the liquid crystal layer 6 in the pixel region 8B, where the cell-gap $d_2$ is smaller. The electric field control structures 16a, 16b also function as the alignment control means for controlling the alignment direction of the liquid crystal molecules 26. Accordingly, in the case that the cell-gap $d_1$ in the pixel regions 8R, 8G is larger than the cell-gap $d_2$ in the pixel region 8B, but the height $h_{12}$ of the electric field control structure and the height $h_{22}$ of the electric field control structure are set to be equal to each other, the alignment control force does not easily act on the liquid crystal molecules 26 in the pixel regions 8R, 8G, where the cell-gap $d_1$ is larger, and on the other hand, the alignment control force easily acts on the liquid crystal molecules 26 in the pixel region 8B, where the cell-gap $d_2$ is smaller. Resultantly, a large difference in the threshold voltage takes place between the pixel regions 8 having different cell-gaps d, which leads to deterioration of the display quality. However, in the present embodiment, the heights $h_{12}$, $h_{22}$ of the electric field control structures 16a, 16b are set to be proportional to the cell-gaps $d_1$, $d_2$, whereby although the cell-gap $d_1$ in the pixel regions 8R, 8G is larger than the cell-gap $d_2$ in the pixel region 8B, the electric field intensity to be applied to the liquid crystal molecules 26 can be made substantially equal to each other. Because of the heights $h_{12}$, $h_{22}$ of the electric field control structures 16a, 16b set to be proportional to the cell-gaps $d_1$, $d_2$, the alignment control force applied to the liquid crystal molecules 26 in the pixel regions 8R, 8G and the alignment control force applied to the liquid crystal molecules 26 in the pixel region 8B can be made substantially equal to each other although the cell-gap $d_1$ in the pixel regions 8R, 8G is larger than the cell-gap $d_2$ in the pixel regions 8B. Thus, according to the present embodiment, even in the case that the cell-gap $d_1$ in the pixel regions 8R, 8G and the cell-gap $d_2$ in the pixel region 8B are different from each other, the threshold voltage in the pixel region 8R, 8G and the threshold voltage in the pixel region 8B can be made substantially equal to each other.

Thus, the TFT substrate 2 is constituted.

Then, the CF substrate 4 will be explained.

A color filter layer 20a, 20b is formed on the underside of the glass substrate 18. The thickness of the color filter layer 20a in the R and the G pixel regions 8R, 8G are set at, e.g., 2.0 μm. In the B pixel region 8B, the thickness of the color filter layer 20b is set at, e.g., 3.0 μm. The thickness of the color filter layer 20b in the B pixel region 8B is larger by, e.g., 1.0 μm than the thickness of the color filter layer 20a in the R and the G pixel regions 8R, 8G.

An opposed electrode 22 of ITO is formed on the underside of the color filter layer 20a, 20b.

Alignment control structures 24a, 24b are formed on the underside of the opposed electrode 22. The alignment control structures 24 are formed zigzag (see FIG. 2). The alignment control structures 24 are arranged, offset from the alignment control blank patterns 14 by a half pitch. The height $h_{11}$ of the alignment control structure 16a formed in the R and the G pixel regions 8R, 8G are set at, e.g., 1.4 μm. The height $h_{21}$ of the alignment control structure formed in the B pixel region 8B is set at, e.g., 1.2 μm. The ratio ($h_{11}/d_1$) of the height $h_{11}$ of the alignment control structure 24a to the cell-gap $d_1$ in the R and G pixel regions and the ratio ($h_{21}/d_2$) of the height $h_{21}$ of the alignment control structure 24b to the cell-gap $d_2$ in the B pixel region are set to be substantially equal to each other.

The ratio of the height $h_{11}$ of the alignment control structure 24a to the cell-gap $d_1$ in the R and G pixel regions and the ratio of the height $h_{21}$ of the alignment control structure to the cell-gap $d_2$ in the B pixel region are set to be substantially equal to each other for the following reason. That is, the alignment control force of the alignment control structures 24a, 24b does not act easily on the liquid crystal molecules 26 as the cell-gap d is larger. Accordingly, in the case that the alignment control structures 24 are formed in the same height in the pixel regions 8 where the cell-gap d is different, the liquid crystal molecules 26 do not easily align in the pixel regions 8R, 8G, where the cell-gap $d_1$ is larger, and in the pixel region 8B, where the cell-gap $d_2$ is smaller, the liquid crystal molecules 26 do not easily align. Then, a large difference is made in the threshold voltage between the pixel regions 8 where the cell-gap d differs, which leads to deterioration of the display quality. However, in the present embodiment, the height of the alignment control structures 24 is increased in proportion with the cell-gap d, whereby the difficult alignment of the liquid crystal molecules 26 in the pixel regions 8R, 8G, where the cell-gap $d_1$ is larger, can be prevented. Thus, according to the present embodiment, even with different cell-gaps $d_1$, $d_2$, the threshold voltages in the respective pixel regions 8 can be made substantially equal to each other.

In the R and the G pixel regions 8R, 8G, the width $w_{11}$ of the alignment control structure 24a is set at, e.g., 12 μm. In the B pixel region 8B, the width $w_{21}$ of the alignment control structure 24b is set at, e.g., 10 μm. The ratio of the width $w_{11}$ of the alignment control structure 24a to the cell-gap $d_1$ of the R and the G pixel regions and the ratio of the width $w_{21}$ of the alignment control structure 24b to the cell-gap $d_2$ of the B pixel region are set to be substantially equal to each other.

The ratio of the width $w_{11}$ of the alignment control structure 24a to the cell-gap $d_1$ of the R and the G pixel regions and the ratio of the width $w_{21}$ of the alignment control structure 24b to the cell-gap $d_2$ of the B pixel region are set to be substantially equal to each other for the following reason. That is, as described above, as the cell-gap d is larger, the alignment control force of the alignment control structures 24 does not easily act on the liquid crystal molecules 26. Accordingly, in the case that the alignment control structures 24 are formed in the same width in the pixel regions 8, where the cell-gap d differ, the liquid crystal molecules 26 do not easily align in the pixel regions 8R, 8G, where the cell-gap $d_1$ is larger, but in the pixel region 8B, where the cell-gap $d_2$ is smaller, the liquid crystal molecules 26 easily align. Then, a large difference is made in the threshold voltage between the pixel regions 8, where the cell-gap d differs, which leads to deterioration of the display quality. However, in the present embodiment, the width of the alignment control structures 24 is larger in proportion with the cell-gap d, whereby the difficult alignment of the liquid crystal molecules 26 in the pixel regions 8R, 8G, where the cell-gap $d_1$ is larger, can be prevented. Thus, according to the present embodiment, even in the case that the cell-gap d differs, the threshold voltages in the respective pixel regions 8 can be mad substantially equal to each other.

Thus, the CF substrate 4 is constituted.

A pole-shaped spacer (not shown), for example, is formed in the B pixel region 8B. The spacer retains the thickness of the liquid crystal layer 6.

Vertical alignment films (not shown) for vertically aligning the liquid crystal molecules 26 are formed respectively on the TFT substrate 2 and the CF substrate 4. The vertical alignment film can be, e.g., the vertical alignment film made by, JSR Corporation.

The liquid crystal 6 is sealed between the TFT substrate 2 and the CF substrate 4. The liquid crystal 6 can be a nematic liquid crystal, which is a liquid crystal having negative dielectric anisotropy. The refractive index anisotropy Δn of the liquid crystal 6 is, e.g., about 0.1.

In the liquid crystal display according to the present embodiment, in which the alignment control structures 24 and the alignment control blank patterns 14 are arranged zigzag, roughly 4 directional domains are realized. The alignment directions of the liquid crystal molecules are 45 degrees, 135 degrees, 225 degrees and 315 degrees with 0 degree set on the right side of the display screen. The areas of the respective display domains for the alignment division are substantially uniform in one pixel.

Thus, the liquid crystal display according to the present embodiment is constituted.

Next, the result of evaluating the liquid crystal display according to the present embodiment will be explained.

Figure 3:
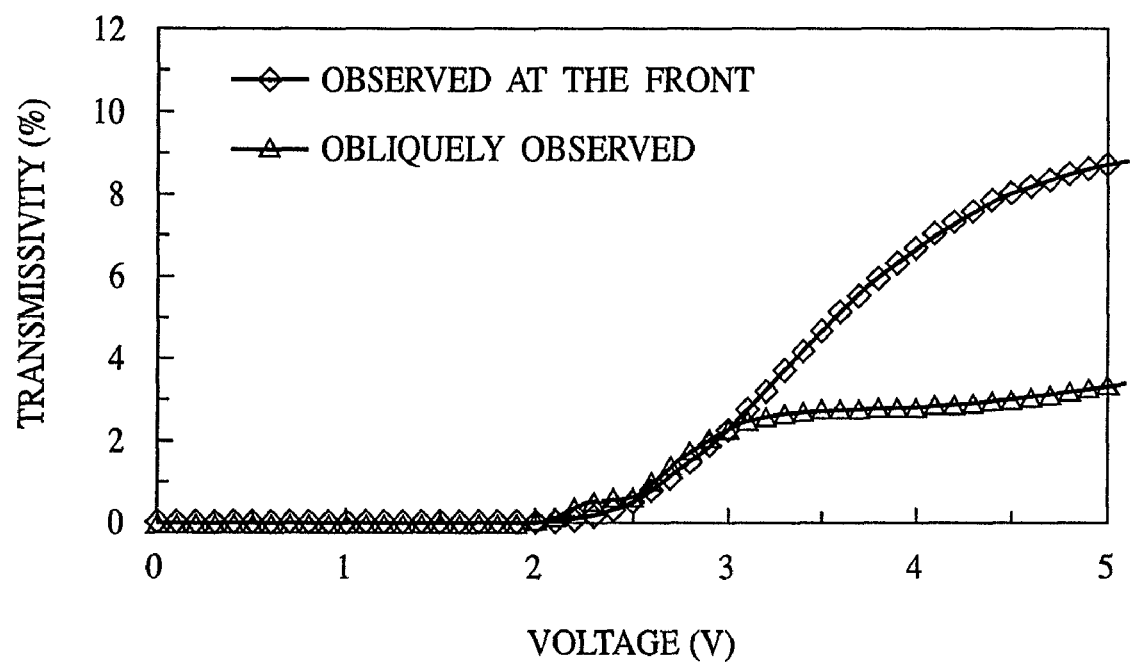
FIG. 3 is a graph of the T-V characteristics of the liquid crystal display according to the first embodiment of the present invention.

First, the T-V characteristics of the evaluation result will be explained with reference to FIG. 3. FIG. 3 is a graph of the T-V characteristics of the liquid crystal display according to the present embodiment. In FIG. 3, the ◇ marks indicate the case that the screen was observed at the front. The Δ marks indicate the case that the screen was observed obliquely. In measuring the T-V characteristics, the voltage applied between the pixel electrodes and the opposed electrode was gradually changed, and transmittivities were measured for the applied voltages. In measuring the transmittivity given when observed obliquely, the polar angle of the view point was 60 degrees, and the screen was observed from above.

As illustrated in FIG. 3, in the liquid crystal display according to the present embodiment, as in said another proposed liquid crystal display, the transmittivity given when observed obliquely is prevented from becoming higher than the transmittivity given when observed at the front (see FIG. 13).

Based on this, according to the present embodiment, as in said another proposed liquid crystal display, it can be prevented that images are observed more brightly when observed obliquely than when observed at the front.

Next, the result of comparing the transmittivity will be explained.

When the transmittivity of the proposed liquid crystal display was 1.0, the transmittivity of said another proposed liquid crystal display was 0.92. The transmittivity of the liquid crystal display according to the present embodiment was 0.93.

Based on this, the present embodiment can have good transmittivity, as do the proposed liquid crystal display and said another proposed liquid crystal display.

Next, it was visually observed whether or not the phenomena that the bright of images is higher when observed obliquely than when observed at the front took place.

This phenomena took place in the proposed liquid crystal display.

This phenomena did not take place in said another proposed liquid crystal display and the liquid crystal display according to the present embodiment.

Based on this, it can be seen that the present embodiment can prevent the brightness given when observed obliquely from being higher than the brightness given when observed at the front.

Figure 4:
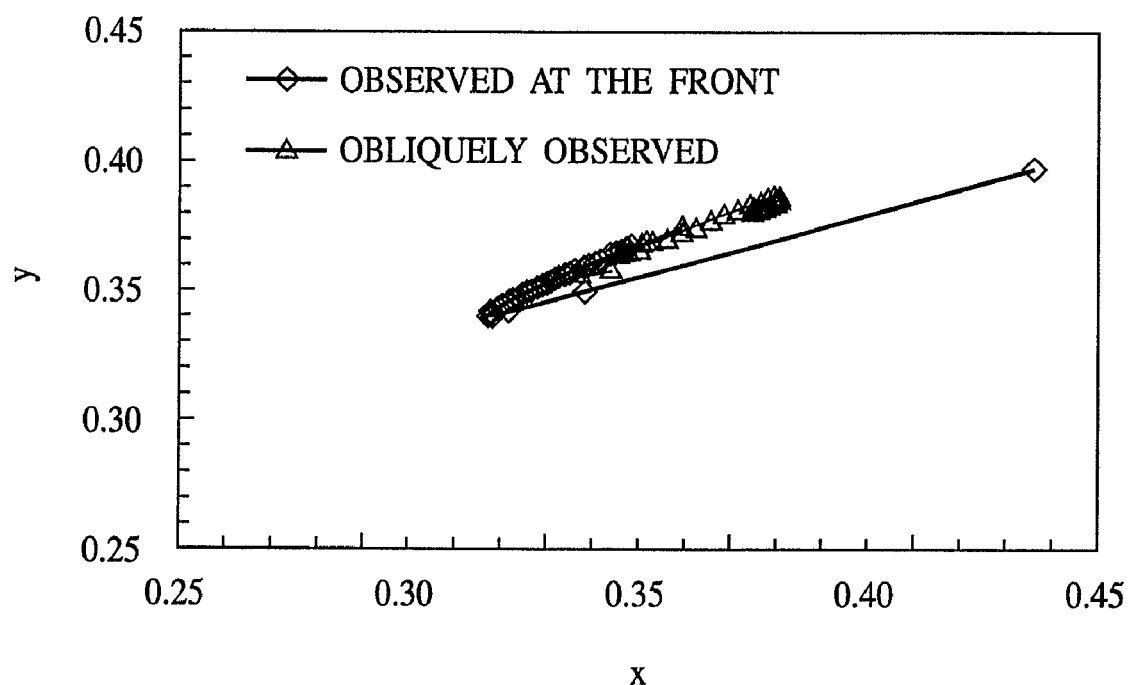
FIG. 4 is a graph of the gradation chromaticity change characteristics of the liquid crystal display according to the first embodiment of the present invention.
Figure 11:
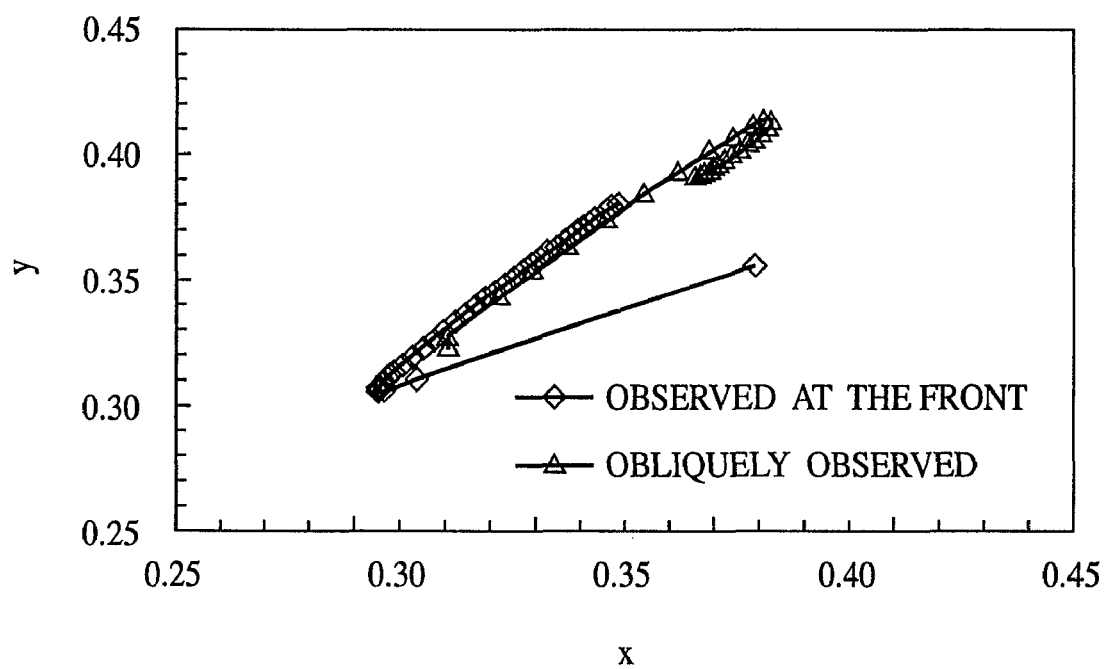
FIG. 11 is a graph of gradation chromaticity change characteristics of the proposed liquid crystal display.

Next, the result of measuring the gradation chromaticity change characteristics will be explained with reference to FIG. 4. FIG. 4 is a graph of gradation chromaticity change characteristics of the liquid crystal display according to the present embodiment. FIG. 11 is a graph of the gradation chromaticity change characteristics of the proposed liquid crystal display. In measuring the gradation chromaticity change characteristics, the gradation was changed gradually from black to white. The xy chromaticities (x, y) at the respective gradations were measured. In FIGS. 4 and 11, the ◇ marks indicate the case that the screen was observed at the front, and the Δ marks indicate the case that the screen was observed obliquely. In observing the screen obliquely, the polar angle of the view point was 60 degrees, and the screen was observed from above.

As seen in FIG. 11, in the proposed liquid crystal display, the chromaticity relatively largely changes in accordance with the gradation changes. The differences in the chromaticity between when observed at the front and when obliquely observed are relatively large.

As described above with reference to FIG. 14, in said another proposed liquid crystal display, the chromaticity largely changes in accordance with the gradation changes. The differences in the chromaticity between when observed at the front and when obliquely observed are relatively large.

However, in the liquid crystal display according to the present embodiment, as seen in FIG. 4, the chromaticity changes in accordance with the gradation changes are depressed. The differences in the chromaticity between when observed at the front and when obliquely observed are relatively small.

Based on this, it can be seen that the present embodiment can depress the chromaticity change in accordance with the gradation change and visual angle changes can be depressed, whereby the disturbance of the color balance can be prevented.

Next, amounts of chromaticity changes given when black color was gradated to white color will be explained.

In the proposed liquid crystal display, when the screen was observed at the front, the chromaticity change amount given when black color was gradated to white color was 0.102.

In said another proposed liquid crystal display, when the screen was observed at the front, the amount of the chromaticity change given when black color was gradated to white color was 0.056.

However, in the liquid crystal display according to the present embodiment, when the screen was observed at the front, the amount of the chromaticity change given when black color was gradated to white color was 0.046.

In the proposed liquid crystal display, when observed obliquely, the chromaticity change amount given when black color was gradated to white color was 0.141.

In said another proposed liquid crystal display, when observed obliquely, the chromaticity change amount given when black color was gradated to white color was 0.168.

In the liquid crystal display according to the present embodiment, when observed obliquely, the chromaticity change amount given when black color was graded to white color was 0.089.

In all the cases, in the oblique observation, the polar angle of the view point was 60 degrees, and the screen was observed from above.

Based on this, the liquid crystal display according to the present embodiment can depress the chromaticity change amount given when black color is gradated to white color both when observed obliquely and when observed at the front.

Next, whether or not the coloring takes place when black color was gradated to white color was visually observed.

In the proposed liquid crystal display, the color balance was much disturbed, and the coloring was conspicuous.

In said another proposed liquid crystal display, the color balance was disturbed, and the coloring took place.

However, in the liquid crystal display according to the present embodiment, the coloring was not found.

Based on this, it is found that the present embodiment can depress the disturbance of the color balance, and the coloring can be prevented.

The liquid crystal display according to the present embodiment is characterized mainly in that the lower threshold regions 11a, 11b and the higher threshold regions 13a, 13b are present in the regions between the alignment control blank patterns 14a, 14b and the alignment control structures 24a, 24b, and the parameters of the alignment control structures 24a, 24b, the alignment control blank patterns 14a, 14b and the electric field control structures 16a, 16b are set corresponding to the cell-gaps $d_1$, $d_2$.

In the present embodiment, in which the lower threshold regions 11a, 11b and the higher threshold regions 13a, 13b are present in the regions between the alignment control blank patterns 14a, 14b and the alignment control structures 24a, 24b, the transmittivity corresponding to the applied voltage increase can be slow. Accordingly, the present embodiment can depress much increase of the transmittivity given when observed obliquely in comparison with the transmittivity given when observed at the front, whereby the brightness given when observed obliquely is prevented from becoming higher than the brightness given when observed at the front. Furthermore, according to the present embodiment, the parameters of the alignment control structures 24a, 24b, the alignment control blank patterns 14a, 14b and the electric field control structures 16a, 16b are set to be proportional to the respective cell-gaps $d_1$, $d_2$, whereby although the cell-gaps $d_1$, $d_2$ are different from each other, the threshold voltages in the respective pixel regions 8 can be made substantially equal to each other. Accordingly, the present embodiment can prevent large chromaticity changes due to changes in the gradation and the visual angle, which leads to the prevention of the coloring. Thus, the liquid crystal display according to the present embodiment can have good display quality.

A SECOND EMBODIMENT

Figure 5:
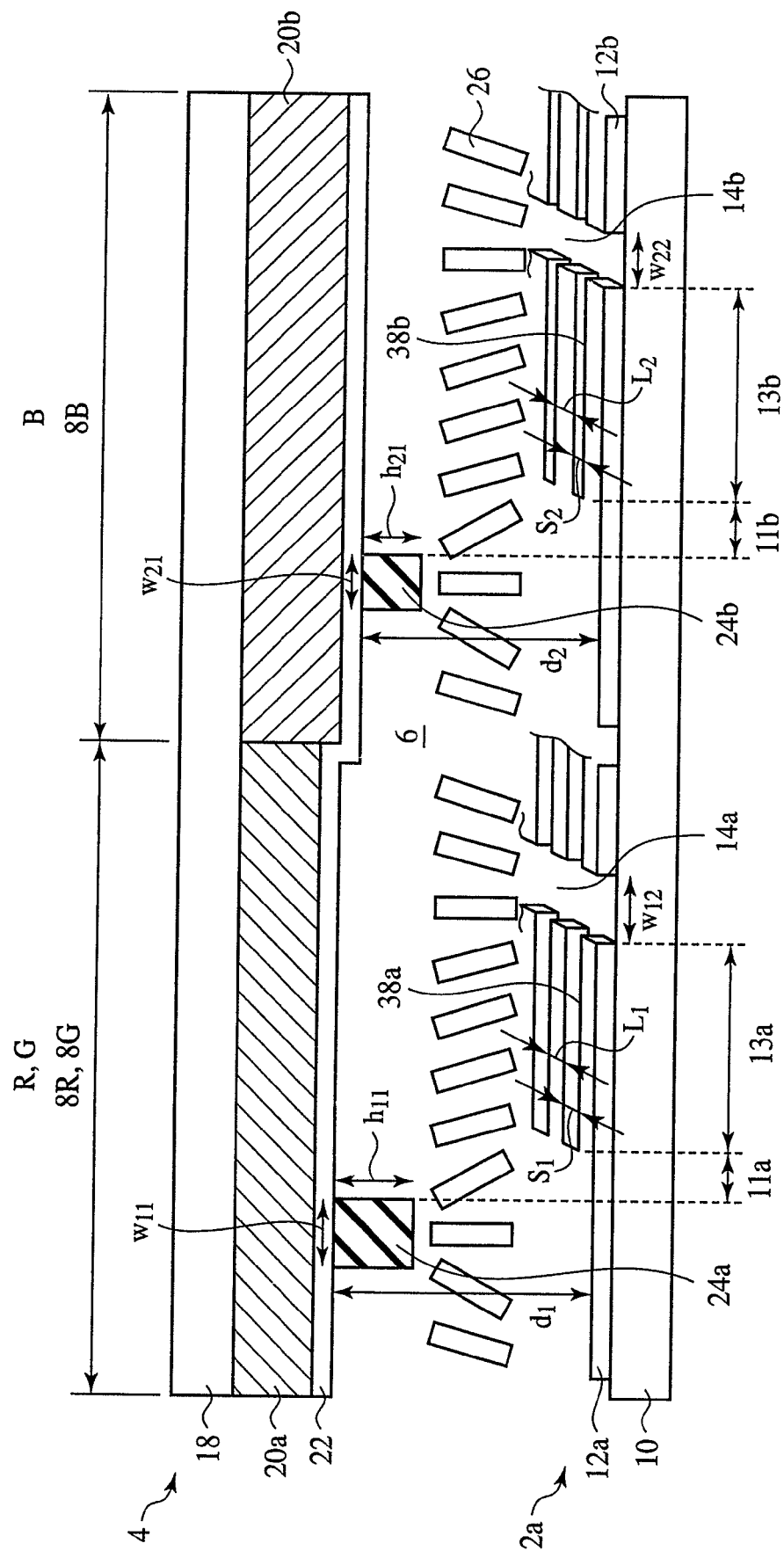
FIG. 5 is a perspective view of the liquid crystal displaying to a second embodiment of the present invention.

The liquid crystal display according to a second embodiment of the present invention will be explained with reference to FIG. 5. FIG. 5 is a perspective view of the liquid crystal display according to the present embodiment. The same members of the present embodiment as those of the liquid crystal display according to the first embodiment illustrated in FIGS. 1 to 4 are represented by the same reference numbers not to repeat or to simplify their explanation.

The liquid crystal display according to the present embodiment is characterized mainly in that electric field control blank patterns 38a, 38b form higher threshold regions 13a, 13b, and the parameters of the electric field control blank patterns 38a, 38b are different from each other in accordance with the cell-gaps $d_1$, $d_2$.

First, a TFT substrate 2a will be explained.

As illustrated in FIG. 5, in pixel electrodes 12a, 12b, a plurality of electric field control blank patterns 38a, 38b are formed, substantially perpendicularly crossing alignment control blank patterns 14a, 14b. The electric field control blank pattern is a region where ITO is not formed in the pixel electrode. The electric field control blank patterns 38a, 38b are for controlling electric fields to be applied to the liquid crystal molecules 26 to thereby control the threshold voltage. Of the regions between the alignment control structures 24a, 24b and the alignment control blank patterns 14a, 14b, the regions 13a, 13b where the electric field control blank patterns 38a, 38b are formed are higher threshold regions where the threshold voltage is relative higher. Of the regions between the alignment control structures 24a, 24b and the alignment control blank patterns 14a, 14b, the regions 11a, 11b where the electric field control blank patterns 38a, 38b are not formed are lower threshold regions where the threshold voltage is relatively lower. In R and G pixel regions 8R, 8G, the width $S_1$ of the electric field control blank pattern 38a is set at, e.g., 5 μm. The distance $L_1$ between the adjacent electric field control blank patterns 38a is set at, e.g., 5 μm. In B pixel region 8B, the width $S_2$ of the electric field control blank pattern 38b is set at, e.g., 3 µm. The distance $L_2$ between the adjacent electric field control blank patterns 38b is set at, e.g., 7 µm.

The width $S_2$ of the electric field control blank pattern 38b in the B pixel region 8B is set to be smaller than the width $S_1$ of the electric filed control blank pattern 38b in the R and the G pixel regions 8R, 8G for the following reason.

That is, in the case that the cell-gap $d_2$ in the B pixel region 8B is smaller than the cell-gap $d_1$ in the R and the G pixel regions 8R, 8G, but the widths $S_1$, $S_2$ of the electric field control blank patterns 38a, 38b are set to be equal to each other, and the distances $L_1$, $L_2$ between the adjacent electric field control blank patterns 38a, 38b are set to be substantially equal to each other in the respective pixel regions 8, the strain of the electric fields in the higher threshold region 13b of the pixel region 8B becomes larger than the strain of the electric fields in the higher threshold region 13a of the pixel regions 8R, 8G. Accordingly, the threshold voltage in the higher threshold region 13b of the B pixel region 8B becomes higher than the threshold voltage in the higher threshold region 13a of the R and the G pixel regions 8R, 8G. However, in the present embodiment, in which the width $S_2$ of the electric field control blank pattern 38b in the B pixel region 8B is set to be smaller, the strain of the electric field due to the electric field control blank pattern 38b can be mitigated. Thus, According to the present embodiment, the cell-gap $d_2$ in the B pixel region 8B is smaller than the cell-gap $d_1$ in the R and the G pixel regions 8R, 8G, but the threshold voltage in the higher threshold region 13b of the B pixel region 8B can be made substantially equal to the threshold voltage in the higher threshold region 13a of the R and the G pixel regions 8R, 8G.

The width $w_{12}$ of the alignment control blank patterns 14a, 14b in the R and the G pixel regions 8R, 8G are set at, e.g., 12 µm, as in the liquid crystal display according to the first embodiment. The width $w_{22}$ of the alignment control blank pattern 14b in the B pixel region 8B is set at, e.g., 10 µm, as in the liquid crystal display according to the first embodiment.

Thus, the TFT substrate 2a is constituted.

A CF substrate 4 is the same as the CF substrate of the liquid crystal display according to the first embodiment, and the explanation of the CF substrate 4 is omitted.

A liquid crystal 6 is sealed between the TFT substrate 2a and the CF substrate 4, as in the liquid crystal display according to the first embodiment.

Thus, the liquid crystal display according to the present embodiment is constituted.

The change of the threshold voltage due to the presence of the electric field control blank patterns 38a, 38b is smaller than the change of the threshold voltage due to the presence of the electric filed control structures 16a, 16b. In term of setting the threshold voltage in the higher threshold regions 13a, 13b to be higher, the presence of the electric field control structures 16a, 16b is more advantageous than the presence of the electric field control blank patterns 38a, 38b. In preventing the phenomena that the brightness given when observed obliquely is higher than the brightness given when observed at the front, the liquid crystal display according to the present embodiment is superior to the liquid crystal display according to the present embodiment.

However, in the liquid crystal display according to the present embodiment, when the electric field control blank patterns 14a, 14b are formed in the pixel electrodes 12a, 12b, the electric field control structures 38a, 38b can be formed, and it is not necessary to form the electric field control structures 16a, 16b separately. Accordingly, the present embodiment can have lower costs than the liquid crystal display according to the first embodiment.

The liquid crystal display according to the present embodiment is characterized mainly in that, as described above, the higher threshold regions 13a, 13b are formed by the electric field control blank patterns 38a, 38b, and the parameters of the electric field control blank patterns 38a, 38b are made different in accordance with the cell-gaps $d_1$, $d_2$.

According to the present embodiment, in which the parameters of the electric field control blank patterns 38a, 38b are made different in accordance with the cell-gaps $d_1$, $d_2$, as in the liquid crystal display according to the first embodiment, the cell-gap $d_2$ in the B pixel region 8B is smaller than the cell-gap $d_1$ in the R and the G pixel regions 8R, 8G, but the threshold voltage in the higher threshold voltage region 13a of the R and the G pixel regions 8R, 8G and the threshold voltage in the higher threshold region 13b of the B pixel region 8B can be made substantially equal to each other. Thus, as does the liquid crystal display according to the first embodiment, the present embodiment can prevent the phenomena that the brightness given when obliquely observed from becomes higher than the brightness given when observed at the front while preventing the phenomena of the coloring.

A THIRD EMBODIMENT

Figure 6:
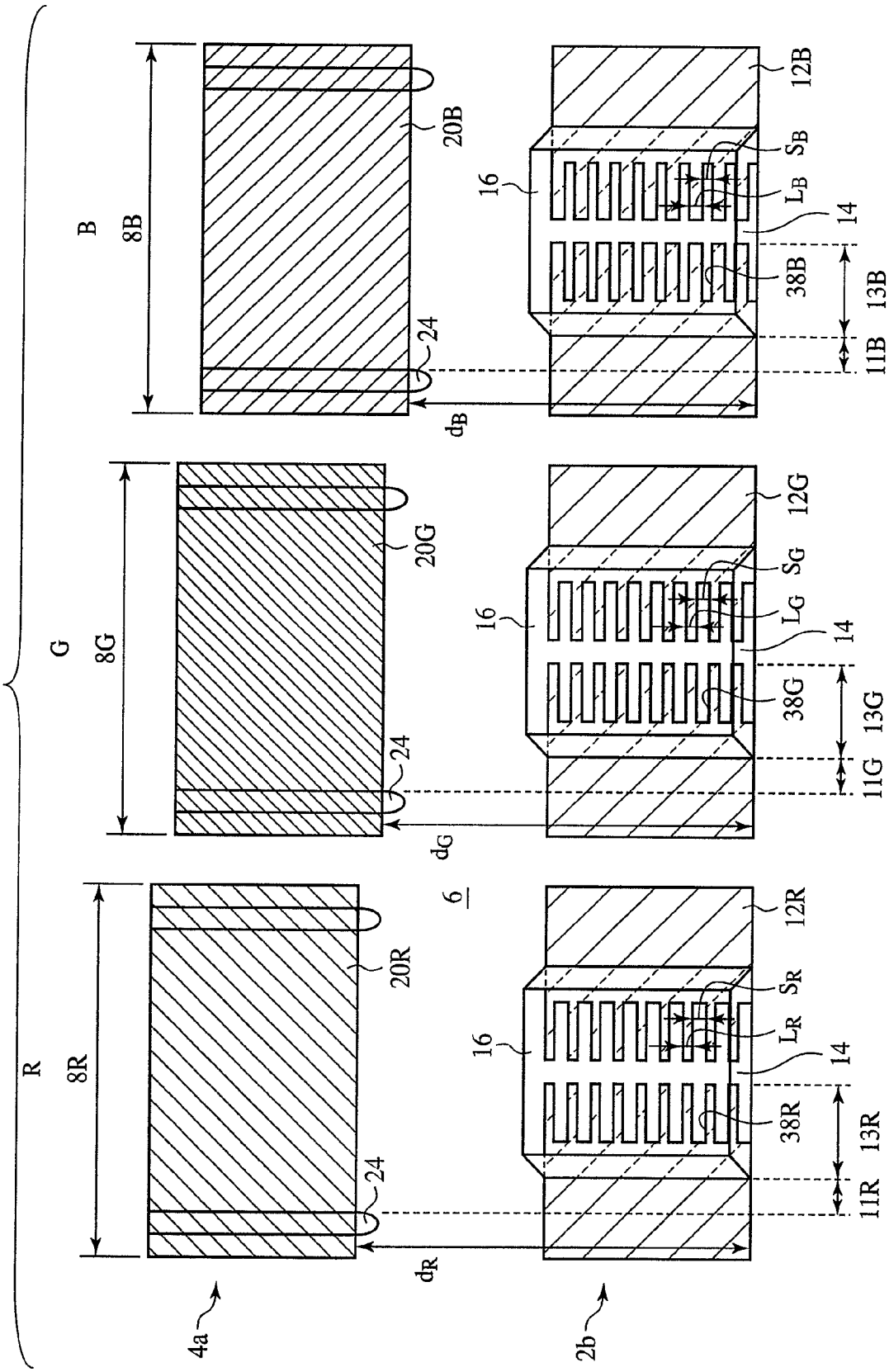
FIG. 6 is a perspective view of the liquid crystal display according to a third embodiment of the present invention.

The liquid crystal display according to a third embodiment of the present invention will be explained with reference to FIG. 6. FIG. 6 is a perspective view of the liquid crystal display according to the present embodiment. The same members of the present embodiment as those of the liquid crystal display according to the first embodiment illustrated in FIGS. 1 to 5 are represented by the same reference numbers not to repeat or to simplify their explanation.

In FIG. 6, an R pixel region (a third pixel region) 8R is illustrated on the left side of the drawing, a G pixel region (a first pixel region) 8G is illustrated at the center of the drawing, and a B pixel region (a second pixel region) 8B is illustrated on the right side of the drawing.

In the R pixel region 8R, the thickness of the liquid crystal layer 6, the cell-gap $d_R$ is set at 5.5 µm. In the G pixel region 8G, the cell-gap $d_G$ is set at, e.g., 5.0 µm. In the B pixel region 8B, the cell-gap $d_B$ is set at, e.g., 4.0 µm.

The cell-gaps $d_R$, $d_G$, $d_B$ of the R, the G, the B pixel regions 8 are different from one another, because the difference in $\Delta n \cdot d / \lambda$ among the respective R, G and B pixel regions 8. $\Delta n$ indicates a refraction index anisotropy, d indicates a cell-gap, and λ indicates a wavelength of light.

First, a TFT substrate 2b will be explained.

Pixel electrodes 12R, 12G, 12B of ITO are formed on a glass substrate 10 (see FIG. 1).

Respective alignment control blank patterns 14 are formed in the pixel electrodes 12R, 12G, 12B. The width of the alignment control blank patterns 14 is set at, e.g., 12 µm.

In the respective pixel regions 8, a plurality of electric field control blank patterns 38R, 38G, 38B are formed, substantially perpendicularly crossing the alignment control blank patterns 14. The electric field control blank patterns 38 are for suitably adjusting the electric field intensity and controlling the threshold voltage.

In the R pixel region 8R, the width $S_R$ of the electric field control blank pattern 38R is set at, e.g., 4.0 µm. The distance $L_R$ between the adjacent electric field control blank patterns 38R is set at, e.g., 2.0 µm.

In the G pixel region 8G, the width $S_G$ of the electric field control blank pattern 38G is set at, e.g., 3.0 µm. In the G pixel region 8G, the distance $L_G$ between the adjacent electric field control blank patterns 38G is set at, e.g., 3.0 µm.

In the B pixel region 8B, the width $S_B$ of the electric field control blank pattern 38B is set at, e.g., 5.0 μm. The distance $L_B$ between the adjacent electric field control blank pattern 38B is set at, e.g., 1.0 μm.

Respective electric field control structures 16 of a dielectric layer are formed on the pixel electrodes 12a, 12b. The height of the electric field control structures 16 was set at, e.g., 1.0 μm. The width of the electric field control structures 16 is set at, e.g., 50 μm. The pitch of the electric field control structures 16 is set at, e.g., 70 μm.

Of the regions between the alignment control blank patterns 14 and the electric field structures 24, the regions where the electric field control structures 16 are formed are higher threshold regions 13R, 13G, 13B. Of the regions between the alignment control blank patterns 14 and the electric field control structures 24, the region where the electric field control structures 16 are not formed are lower threshold regions 11R, 11G, 11B.

In the present embodiment, the widths S and the distances L of the electric field control blank patterns 38R, 38G, 38B are made different from one another in accordance with the cell-gap $d_R$, $d_G$, $d_B$ for the following reason.

That is, in the case that the cell-gaps d of the R, the G and the B pixel regions 8 are different from one another, but the heights, etc. of the electric field control structures 16 are set to be the same in the respective pixel regions 8, the threshold voltages in the higher threshold regions 13 are made different from one another. Then, the color balance is disturbed, and the phenomena of the coloring takes place.

However, in the present embodiment, the electric field control blank patterns 38 are formed below the electric field control structures 16, and the widths S and the distances L of the electric field control blank patterns 38 are suitably set in accordance with the cell-gaps d, whereby even in the case that the heights of the electric field control structures 16 are made the same in the respective pixel regions 8, the threshold voltages in the higher threshold regions 13R, 13G, 13B in the respective pixel regions 8R, 8G, 8B can be made substantially equal to one another. Thus, the present embodiment can prevent the disturbance of the color balance and the phenomena of the coloring.

Thus, the TFT substrate 2b is constituted.

Next, a CF substrate 4a will be explained.

A color filter layer 20R, 20G, 20B is formed on the underside of a glass substrate 18 (see FIG. 1). In the R pixel region 8R, the thickness of the color filter layer 20R is set at, e.g., 1.5 μm. In the G pixel region 20G, the thickness of the color filter layer 20G is set at, e.g., 2.0 μm. In the B pixel region 8B, the thickness of the color filter layer 20B is set at, e.g., 3.0 μm. The thickness of the color filter layer 20B in the B pixel region 8B is larger by 1.5 μm than the thickness of the color filter layer 20R in the R pixel region 8R. The thickness of the color filter layer 20G in the G pixel region 8G is larger by 0.5 μm than the thickness of the color filter layer 20R in the R pixel region 8R.

An opposed electrode 22 (see FIG. 1) of ITO is formed on the underside of the color filter layer 20.

On the underside of the opposed electrode 22, alignment control structures 24 are formed. The heights of the alignment control structures 24 are all set at, e.g., 1.5 μm. The widths of the alignment control structures 24 are all set at, e.g., 12 μm. The pitch of the alignment control structures 24 are all set at, e.g., 70 μm.

Thus, the CF substrate 4a is constituted.

A liquid crystal 6 is sealed between the TFT substrate 2b and the CF substrate 4a.

Thus, the liquid crystal display according to the present embodiment is constituted.

Then, the result of evaluating the liquid crystal display according to the present embodiment will be explained.

First, change amounts of the chromaticity given when black color was gradated to white color will be explained.

Figure 15:
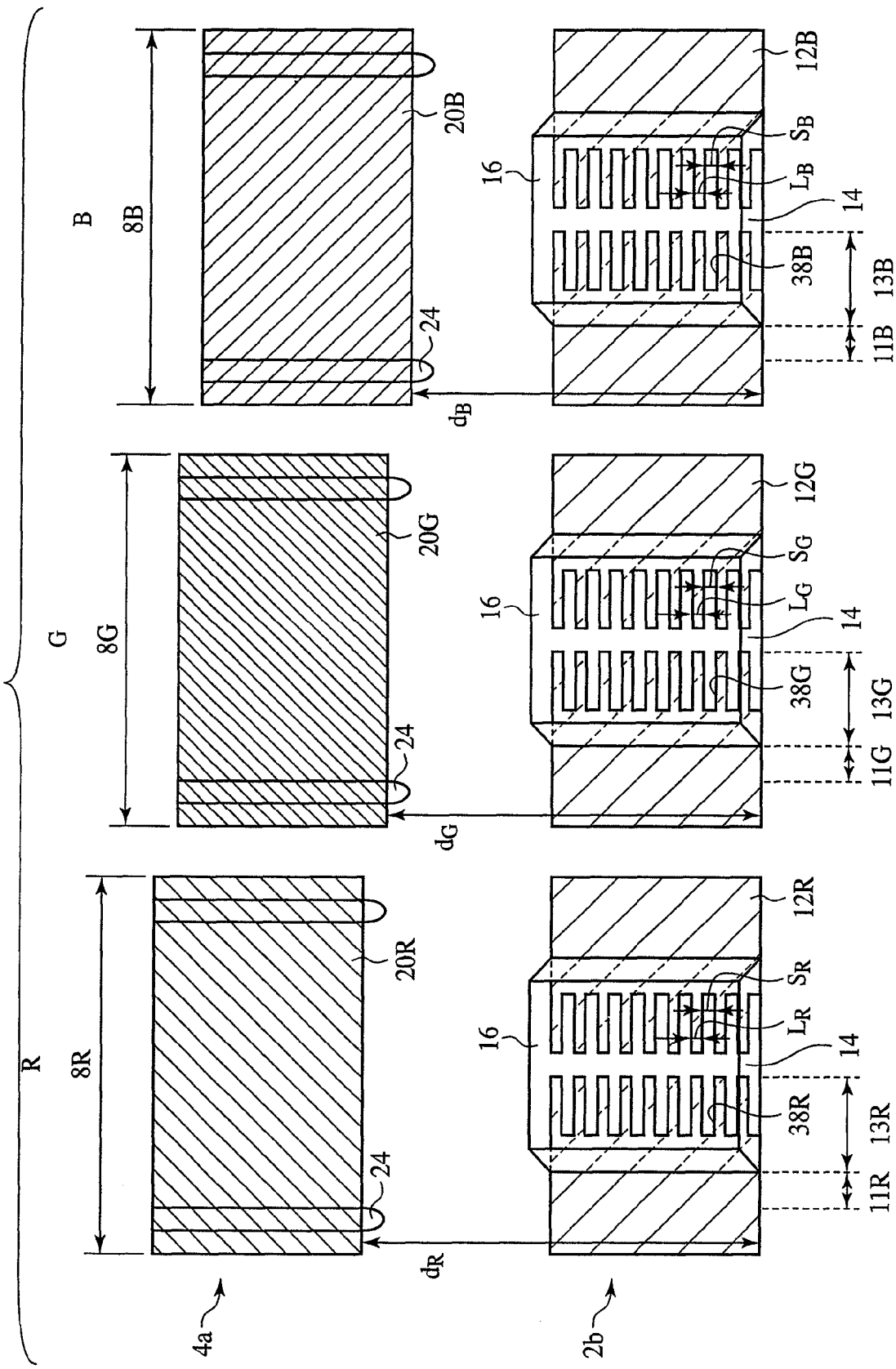
FIG. 15 is a perspective view of the liquid crystal display according to Control 1.

FIG. 15 is a perspective view of the liquid crystal display according to Control 1. In the liquid crystal display according to Control 1, the widths $S_R$, $S_G$, $S_B$ of the electric field control blank patterns 38R, 38G, 38B are all set at 3.0 μm. The distances $L_R$, $L_G$, $L_B$ between the adjacent electric field control blank patterns 38R, 38G, 38B are all set at 3.0 μm.

In the liquid crystal display according to Control 1, change amounts of the chromaticities given when black color was gradated to white color were 0.048 when observed at the front and 0.143 when observed obliquely.

In contrast to this, in the liquid crystal display according to the present embodiment, the change amounts of the chromaticities given when black color was gradated to white color were 0.032 when observed at the front and 0.068 when observed obliquely.

In all the cases, for the oblique observation, the polar angle of the visual angle was 60 degrees, and the screen was observed from above.

Based on this, it is found that the liquid crystal display according to the present embodiment can suppress the chromaticity change amount given when black color is gradated to white color both when observed at the front and when observed obliquely.

Next, it was visually observed whether or not the phenomena that images are observed dark when observed at the front but bright when observed obliquely takes place.

Such phenomena took place neither in the liquid crystal display according to Control 1 nor in the liquid crystal display according to the present embodiment.

Based on this, it can be seen that the present embodiment can prevent the brightness given when observed obliquely from being higher than the brightness given when observed at the front.

Then, it was observed visually whether or not the phenomena that the color balance is disturbed when black color is gradated to white color takes place.

In the liquid crystal display according to Control 1, the phenomena that the color balance is disturbed, and the coloring takes place. More specifically, yellowish coloring took place at specific half tones.

In contrast to this, in the liquid crystal display according to the present embodiment, the coloring phenomena was not confirmed at all the tones.

Based on this, the liquid crystal display according to the present embodiment can prevent the occurrence of the coloring phenomena, whereby the liquid crystal display can have good display quality.

The liquid crystal display according to the present embodiment is characterized mainly in that the width and distance of the electric field control blank patterns 38 can be set suitably in accordance with the cell-gaps d.

In the present embodiment, the parameters of the electric field control blank patterns 38, such as the width, the distance, etc., are set suitably in accordance with the cell-gaps d, whereby even in the case that the parameters of the electric field control blank patterns 14, the electric field control structures 16 and the alignment control structures 24 are set the same among the respective pixel regions 8, the threshold voltages in the higher threshold regions 13 can be made substantially the same. Thus, the present embodiment can prevent the occurrence of the phenomena that the brightness given when observed obliquely than the brightness given when observed at the front while preventing the occurrence of the coloring.

According to the present embodiment, the parameters of the electric field control structures 16, since the alignment control structures 24, etc. are set to be the same among the respective pixel regions 8, it is possible to simply the fabrication process of the liquid crystal display.

According to the present embodiment, the parameters of the electric field control structures 16, the alignment control structures 24, etc. are set to be the same among the respective pixel regions 8, whereby the response speed is prevented from varying among the respective regions 8.

A FOURTH EMBODIMENT

Figure 7:
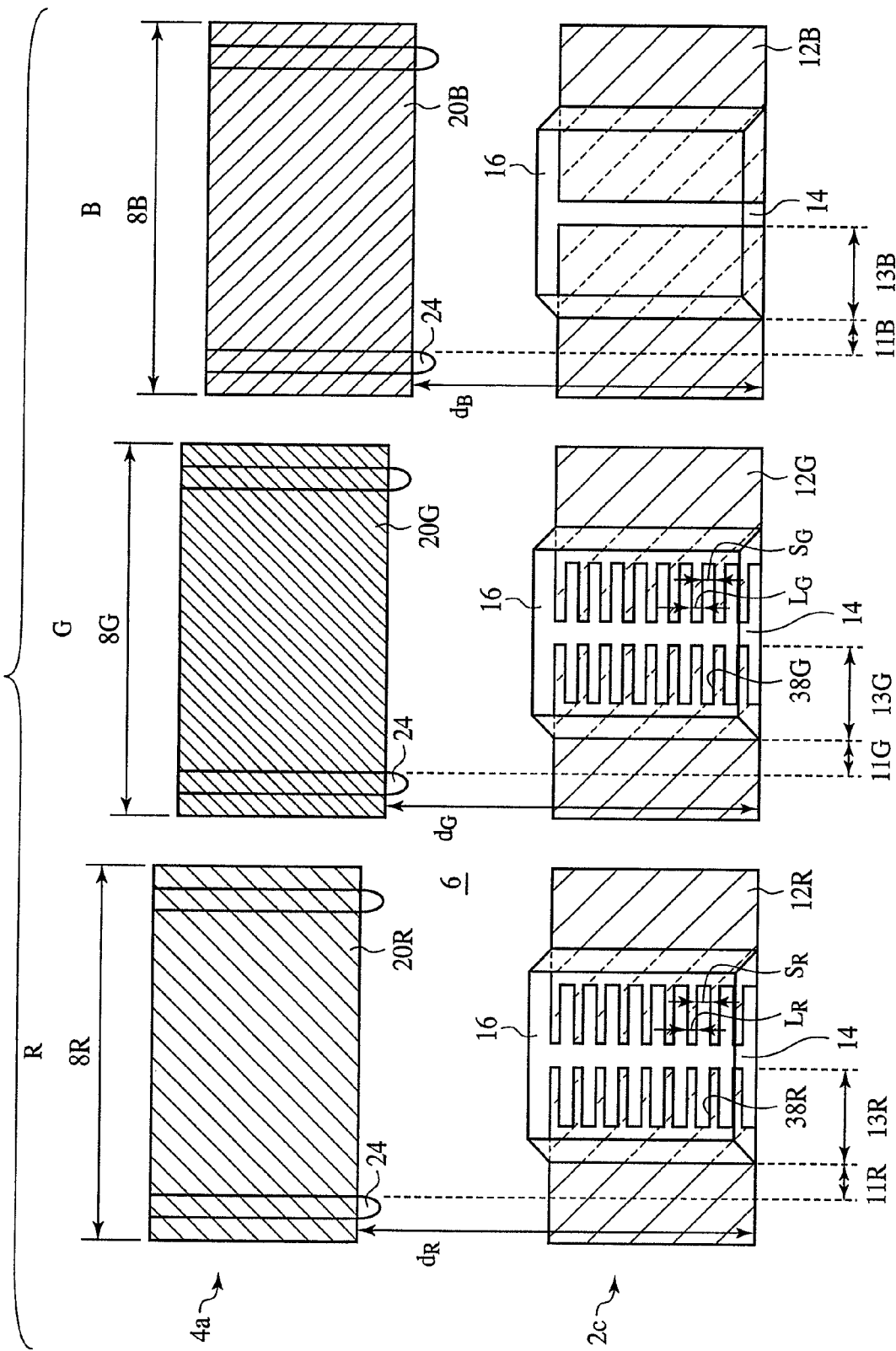
FIG. 7 is a perspective view of the liquid crystal display according to a fourth embodiment of the present invention.

The liquid crystal display according to a fourth embodiment of the present invention will be explained with reference to FIG. 7. FIG. 7 is a perspective view of the liquid crystal display according to the present embodiment. The same members of the present embodiment as those of the liquid crystal display according to the first to the third embodiments illustrated in FIGS. 1 to 6 are represented by the same reference numbers not to repeat or to simplify their explanation.

The liquid crystal display according to the present embodiment is characterized mainly in that an electric field control blank pattern 16B (see FIG. 6B) is not formed in the higher threshold region 13B of a B pixel region 8B.

First, a TFT substrate 2c will be explained.

As illustrated in FIG. 7, as in the liquid crystal display according to the third embodiment, an electric field control blank pattern 38R is formed in the higher threshold region 13R of an R pixel region 8R. The parameters of the electric field control blank pattern 38R are set to be the same as those in the liquid crystal display according to the third embodiment.

As in the liquid crystal display according to the third embodiment, an electric field control blank pattern 38G is formed in a G pixel region 8G. The parameters of the electric field control blank pattern 38G are set to be the same as those in the liquid crystal display according to the third embodiment.

In the B pixel region 8B, however, the electric field control blank pattern 38B is not formed (see FIG. 6). In the present embodiment, the electric field control blank pattern 38B is not formed in the B pixel region 8B for the following reason. That is, as described above in the third embodiment, it is preferable that in the B pixel region 8B, the width $S_B$ of the electric field control blank pattern 38B is set at about 1.0 µm. In terms of the fabrication process, however, it is not easy to form the electric field control blank pattern 38B having a width of 3.0 µm or below 3.0 µm. When the electric field control blank pattern 38B of an about 1.0 µm-width is formed, the width $S_B$ of the electric field control blank pattern 38B is varied, which is a factor for disunifom display, etc. Then, in the present embodiment, the electric field control blank pattern 38B is not formed in the B pixel region 8B. The electric field control blank pattern 38B having such an extremely small width is not effective in reducing the electric field intensity, and the absence of the electric field control blank pattern 38B never affect the display characteristics.

Thus, the TFT substrate 2c is constituted.

The CF substrate 4a is the same as that of the liquid crystal display according to the third embodiment described above with reference to FIG. 6, and the description of the CF substrate 4a will be omitted.

A liquid crystal 6 is sealed between the TFT substrate 2c and the CF substrate 4.

Thus, the liquid crystal display according to the present embodiment is constituted.

Next, the result of evaluating the liquid crystal display according to the present embodiment will be explained.

First, change amounts of chromaticities given when black color was gradated to white color will be explained.

In the liquid crystal display according to the present embodiment, the change amounts of chromaticities given when black color was gradated to white color were 0.040 when observed at the front and was 0.081 when observed obliquely. For the oblique observation, the polar angle of the view point was 60 degrees, and the screen was observed from above.

Based on this, it is seen that the liquid crystal display according to the present embodiment can more decrease the change amount of the chromaticity given when black color is graded to white color in comparison with the liquid crystal display according to Control 1 described above.

However, in the liquid crystal display according to the present embodiment, the change amount of the chromaticity given when black color is gradated to white color is larger in comparison with that in the liquid crystal display according to the third embodiment described above.

Next, whether or not the phenomena that the brightness given when observed obliquely is higher than the brightness given when observed at the front takes place was visually observed.

In the liquid crystal display according to the present embodiment, this phenomena did not take place. Based on this, the present embodiment as well can prevent the brightness given when observed obliquely from being higher than the brightness given when observed at the front.

Next, whether or not the coloring phenomena takes place when black color is graded to white color was visually observed.

In the liquid crystal display according to the present embodiment, the so-called coloring was not confirmed. Based on this, the present embodiment can prevent the coloring phenomena.

As described above, the liquid crystal display according to the present embodiment is characterized mainly in that the electric field control blank pattern 38B is not formed in the higher threshold region 13B of the B pixel region 8B.

As described above, in terms of the fabrication process, it is not easy to form the electric field control blank pattern 38B of an extremely small width. When the electric field control blank pattern 38B of an extremely small width is formed, the width of the electric field control blank pattern 38B is varied, which is a factor for disuniform display, etc. However, in the present embodiment, the electric field control blank pattern 38B is not formed in the B pixel region 8B intentionally, where the electric field control blank pattern 38B must be formed in a narrow width, whereby the occurrences of disuniform displays, etc. can be prevented.

A FIFTH EMBODIMENT

Figure 8:
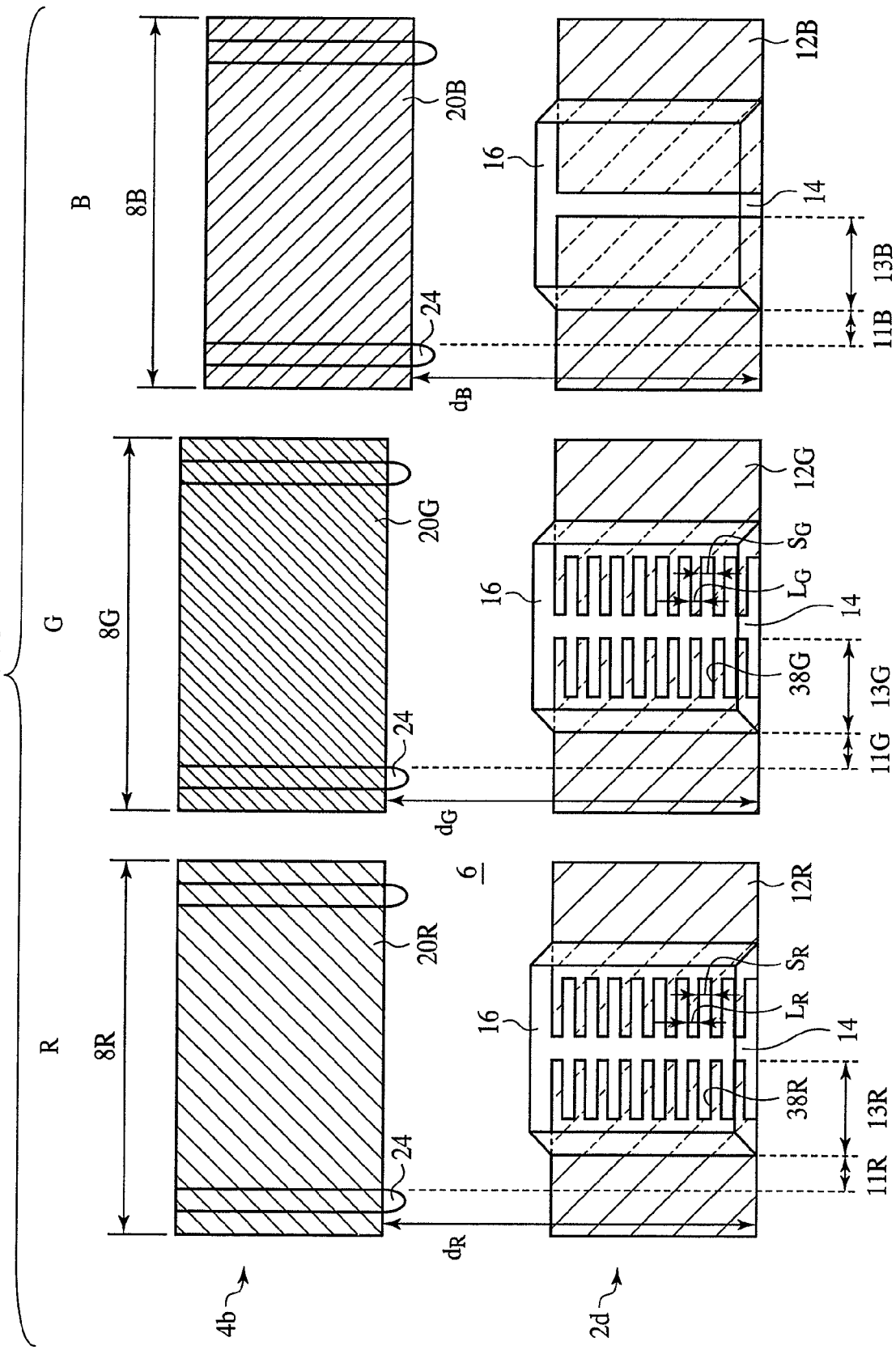
FIG. 8 is a perspective view of the liquid crystal display according to a fifth embodiment of the present invention.

The liquid crystal display according to a fifth embodiment of the present invention will be explained with reference to FIG. 8. FIG. 8 is a perspective view of the liquid crystal display according to the present embodiment. The Same members of the present embodiment as those of the liquid crystal display according to the first to the fourth embodiments illustrated in FIGS. 1 to 7 are represented by the same reference numbers not to repeat to simplify their explanation.

The liquid crystal display according to the present embodiment is characterized mainly in that the cell-gap $d_R$ in an R pixel region 8R and the cell-gap $d_G$ in a G pixel region 8G are set to be equal to each other.

First, a TFT substrate 2d will be explained.

As illustrated in FIG. 8, an electric field control blank pattern 38R is formed in a pixel electrode 12R in the R pixel region 8R. The width $S_R$ of the electric field control blank pattern 38R is set at, e.g., 3.0 μm. The distance $L_R$ of the adjacent electric field control blank patterns 38R is set at, e.g., 3.0 μm.

An electric field control blank pattern 38G is formed in the pixel electrode 12G in a G pixel region 8G, as in the liquid crystal display according to the third embodiment. The parameters of the electric field control blank pattern 38G are set to be the same as those of the liquid crystal display according to the third embodiment.

The parameters of the electric field control blank pattern 38R in the R pixel region 8R and the parameter of the electric field control blank pattern 38G in the G pixel region 8G are set to be equal to each other. In the present embodiment, the parameters of the electric field control blank pattern 38R in the R pixel region 8R and the parameters of the electric field control blank pattern 38G in the G pixel region 8G are set to be equal to each other, because, as will be described later, the cell-gap $d_R$ in the R pixel region 8R and the cell-gap $d_G$ in the G pixel region 8G are set to be equal to each other.

An electric field control blank pattern 38B (see FIG. 6) is not formed in the B pixel region 8B, as is not in the liquid crystal display according to the fourth embodiment.

Thus, the TFT substrate 2d is constituted.

Next, a CF substrate 4b will be explained.

A color filter layer 20R, 20G, 20B is formed on the underside of a glass substrate 18 (see FIG. 1). The thickness of the color filter layer 20R, 20G in the R and the G pixel region 8R, 8G is set at, e.g., 2.0 μm. The thickness of the color filter layer 20B in the B pixel region 8B is set at, e.g., 3.0 μm. The thickness of the color filter layer 20B in the B pixel region 8B is set to be larger by 1.0 μm than the thickness of the color filter layer 20R, 20G in the R and the G pixel regions 8R, 8G.

An opposed electrode 22 (see FIG. 1) of ITO is formed on the underside of the color filter layer 20.

Alignment control structures 24 are formed on the underside of the opposed electrode 22. The height of the alignment control structures 24 is all set at, e.g., 1.5 μm, as is in the liquid crystal display according to the third and the fourth embodiments. The width of the alignment control structures 24 is all set at, e.g., 12 μm as is in the liquid crystal display according to the third and the fourth embodiments. The pitch (period) of the alignment control structures 24 is set at, e.g., 70 μm.

Thus, the CF substrate 4b is constituted.

A liquid crystal 6 is sealed between the TFT substrate 2d and the CF substrate 4b.

The cell-gap $d_R$ in the R pixel region 8R and the cell-gap $d_G$ in the G pixel region 8G are both set at, e.g., 5.0 μm. The cell-gap $d_B$ in the B pixel region 8B is set at, e.g., 4.0 μm.

In the present embodiment, the cell-gap $d_R$ in the R pixel region 8R and the cell-gap $d_G$ in the G pixel region 8G are set to be equal to each other so as to simplify the structure and reduce the cost.

For the following reason, the cell-gap $d_G$ in the G pixel region 8G and the cell-gap $d_B$ in the B pixel region 8B are not set to be equal to each other, but the cell-gap $d_R$ in the R pixel region 8R and the cell-gap $d_G$ in the G pixel region 8G are set to be equal to each other. That is, when the cell-gap d is set to be larger than an idealistic value, the alignment control of the liquid crystal molecules 26 (see FIG. 1) is difficult, and resultantly defective displays, such as rough displays, etc., tend to occur. Accordingly, it is more preferable that the cell-gap d is smaller than an idealistic value than larger than the idealistic value. The difference in Δn·d/λ is smaller with the cell-gap $d_R$ in the R pixel region 8R set to be equal to the cell-gap $d_G$ in the G pixel region 8G than with the cell-gap $d_G$ in the G pixel region set to be equal to the cell-gap $d_B$ in the B pixel region 8B. For such reason, in the present embodiment, the cell-gap $d_G$ in the G pixel region 8G and the cell-gap $d_B$ in the B pixel region 8B are not set to be equal to each other, but the cell-gap $d_R$ in the R pixel region 8R and the cell-gap $d_G$ in the G pixel region 8G are set to be equal to each other.

Thus, the liquid crystal display according to the present embodiment is constituted.

Then, the result of evaluating the liquid crystal display according to the present embodiment will be explained.

Change amounts of the chromaticities given when black color was gradated to white color will be explained.

FIG. 16 is a perspective view of the liquid crystal display according to Control 2. In the liquid crystal display according to Control 2, the widths $S_R$, $S_G$, $S_B$ of the electric field control blank patterns 38R, 38G, 38 were all set at 3.0 μm. The distances $L_R$, $L_G$, $L_B$ of the electric field control blank patterns 38R, 38G, 38B were all set at 3.0 μm. The cell-gap $d_R$ in the R pixel region 8R and the cell-gap $d_G$ in the G pixel region 8G are set to be equal to each other. Specifically, the cell-gap $d_R$ in the R pixel region 8R and the cell-gap $d_G$ in the G pixel region 8G were set at 5.0 μm. The cell-gap in the B pixel region 8B was set at 4.0 μm, as is in the liquid crystal display according to the present embodiment.

In the liquid crystal display according to Control 2, the chromaticity change amount given when black color was gradated to white color is 0.056 when observed at the front and was 0.168 when obliquely observed.

In contrast to this, in the liquid crystal display according to the present embodiment, the chromaticity change amount given when black color was gradated to white color was 0.053 when observed at the front and was 0.092 when obliquely observed.

For the oblique observation, the polar angle of the view point was 60 degrees, and the screen was observed from above.

Based on this, it is seen that the liquid crystal display according to the present embodiment can more reduce the chromaticity change amount given when black color is gradated to white color than the liquid crystal display according to Control 2.

However, in comparison with the chromaticity change amount of the liquid crystal display according to the third and the fourth embodiments given when black color is gradated to white color, the chromaticity change amount of the liquid crystal display according to the present embodiment is larger.

Next, whether or not the phenomena that the brightness given when observed obliquely is higher than the brightness given when observed at the front takes place was visually observed.

In the liquid crystal display according to the present embodiment as well, such phenomena did not take place. Based on this, it is seen that the present embodiment can prevent the brightness given when observed obliquely from being higher than the brightness given when observed at the front.

Next, whether or not the coloring phenomena takes place when black color is gradated to white color was visually observed.

In the liquid crystal display according to the present embodiment, the coloring phenomena was not confirmed.

Based on this, it is seen that the present embodiment can prevent the occurrence of the coloring phenomena.

The liquid crystal display according to the present embodiment is characterized mainly in that, as described above, the cell-gap $d_R$ in the R pixel region 8R and the cell-gap $d_G$ in the G pixel region 8G are set to be equal to each other.

According to the present embodiment, the cell-gap $d_R$ in the R pixel region 8R and the cell-gap $d_G$ in the G pixel region 8G are set to be equal to each other, whereby the structure can be simple. Accordingly, the liquid crystal display according to the present embodiment can have good display quality at low cost.

MODIFIED EMBODIMENTS

The present invention is not limited to the above-described embodiments and can cover other various modifications.

In the above-described embodiments, the present invention is applied to, e.g., MVA type liquid crystal displays, but the principle of the present invention is applicable not only to MVA type liquid crystal displays, but also to any other liquid crystal displays.

In the above-described embodiments, the alignment control blank patterns are formed as the alignment control means formed on the TFT substrate. However, the alignment control means formed on the TFT substrate is not limited to the alignment control blank pattern, and alignment control structures may be formed as the alignment control means formed on the TFT substrate.

In the above-described embodiments, the alignment control structure is formed as the alignment control means formed on the CF substrate. However, the alignment control means formed on the CF substrate is not limited to the alignment control structure. For example, alignment control blank pattern may be formed as the alignment control means formed on the CF substrate.

In the above-described embodiments, the alignment control blank pattern is formed on the TFT substrate, and on the CF substrate the alignment control structure is formed. However, the alignment control structure may be formed on the TFT substrate, and the alignment control blank pattern may be formed on the CF substrate.

In the above-described embodiments, the electric filed control structure is formed on the TFT substrate but may be formed on the CF substrate.

In the above-described embodiments, the electric field control blank pattern is formed in the pixel electrode on the TFT substrate but may be formed in the opposed elected on the CF substrate.

In the above-described embodiments, the width and the distance of the electric field control blank pattern are suitably set, but the pitch of the electric field control blank pattern may be suitably set.

In the above-described embodiments, the electric field control blank pattern is formed in stripes but may be formed in a mesh.

In the above-described embodiments, the alignment control structure and the electric field control structure are formed of dielectrics, but the materials of the alignment control structure and the electric field control structure are not limited to dielectrics. A conductor may be suitably used as a material of the alignment control structure and electric field control structure.

In the above-described embodiments, the layout is made with the center line of the alignment control blank pattern and that of the electric field control structure in agreement with each other. However, the layout is not limited to the layout described above. However, the electric field control structure functions as alignment control means, and it is preferable to arrange the electric field control structure suitably to align the liquid crystal molecules in a desired direction.

In the above-described embodiments, the electric field control blank pattern has a rectangular shape. However, the shape of the electric filed control blank pattern is not limited to the rectangular shape. The electric field control blank pattern may be, e.g., wedge-shaped.

What is claimed is:

1. A liquid crystal display comprising:
   a first substrate including a first pixel electrode and a second pixel electrode;
   a second substrate with an opposed electrode formed thereon, the opposed electrode opposing to the first pixel electrode and the second pixel electrode; and
   a liquid crystal layer sealed between the first substrate and the second substrate,
   a thickness of the liquid crystal layer in a first pixel region on the first pixel electrode being larger than a thickness of the liquid crystal layer in a second pixel region on the second pixel electrode;
   the first pixel region including a first partial region, and a second partial region where a threshold voltage is higher than in the first partial region, and the second pixel region including a third partial region and a fourth partial region where a threshold voltage is higher than in the third partial region; and
   the threshold voltage in the first partial region and the threshold voltage in the third partial region being equal to each other, and the threshold voltage in the second partial region and the threshold voltage in the fourth partial region being equal to each other, wherein
   a plurality of first electric field control blank patterns for controlling an electric field to be applied to liquid crystal molecules of the liquid crystal layer are formed in the first pixel electrode or the opposed electrode in the second partial region and,
   a plurality of second electric field control blank patterns for controlling an electric field to be applied to the liquid crystal molecules of the liquid crystal layer are formed in the second pixel electrode or the opposed electrode in the fourth partial region, and
   a width or a pitch of the first electric field control blank patterns is different from a width or a pitch of the second electric field control blank patterns.

2. A liquid crystal display according to claim 1, wherein
   a first electric field control structure for controlling an electric field to be applied to liquid crystal molecules of the liquid crystal layer is formed on the first substrate or the second substrate in the second partial region, and a second electric field control structure for controlling an electric field to be applied to the liquid crystal molecules of the liquid crystal layer is formed on the first substrate or the second substrate in the fourth partial region.

3. A liquid crystal display according to claim 2, wherein
   a first alignment control blank pattern for controlling an alignment direction of the liquid crystal molecules of the liquid crystal layer is formed on the first pixel electrode or the opposed electrode in the second partial region,
   a second alignment control blank pattern for controlling an alignment direction of the liquid crystal molecules of the liquid crystal layer is formed on the second pixel electrode or the opposed electrode in the fourth partial region, the first electric field control blank pattern is formed, crossing the first alignment control blank pattern vertically, and the second electric field control blank pattern is formed, crossing the second alignment control blank pattern vertically.

4. A liquid crystal display according to claim 3, wherein
the first substrate further includes a third pixel electrode,
a thickness of the liquid crystal layer in a third pixel region on the third pixel electrode is larger than a thickness of the liquid crystal layer in the first pixel region,
the third pixel region includes a fifth partial region, and a sixth partial region where a threshold voltage is higher than in the fifth partial region,
a third electric field control structure for controlling an electric field to be applied to the liquid crystal molecules of the liquid crystal layer is formed on the first substrate or the second substrate in the sixth partial region,
a plurality of the third electric field control blank patterns for controlling an electric field to be applied to the liquid crystal molecules of the liquid crystal layer are formed on the third pixel electrode or the opposed electrode in the sixth partial region, and
a width or a pitch of the third electric field control blank pattern is different from a width or a pitch of the first and the second electric field control blank pattern.

5. A liquid crystal display comprising:
a first substrate including a first pixel electrode and a second pixel electrode;
a second substrate with an opposed electrode formed thereon, the opposed electrode opposing to the first pixel electrode and the second pixel electrode; and
a liquid crystal layer sealed between the first substrate and the second substrate,
a thickness of the liquid crystal layer in a first pixel region on the first pixel electrode being larger than a thickness of the liquid crystal layer in a second pixel region on the second pixel electrode;
the first pixel region including a first partial region, and a second partial region where a threshold voltage is higher than in the first partial region, and the second pixel region including a third partial region and a fourth partial region where a threshold voltage is higher than in the third partial region;
the threshold voltage in the first partial region and the threshold voltage in the third partial region being equal to each other, and the threshold voltage in the second partial region and the threshold voltage in the fourth partial region being equal to each other, wherein
a first electric field control structure for controlling an electric field to be applied to liquid crystal molecules of the liquid crystal layer is formed on the first substrate or the second substrate in the second partial region, and a second electric field control structure for controlling an electric field to be applied to the liquid crystal molecules of the liquid crystal layer is formed on the first substrate or the second substrate in the fourth partial region, and
a plurality of electric field control blank patterns for controlling an electric field to be applied to the liquid crystal molecules of the liquid crystal layer are formed on the first pixel electrode or the opposed electrode in the second partial region, and the electric field control blank pattern is not formed on the second pixel electrode and the opposed electrode in the fourth partial region.

6. A liquid crystal display according to claim 5, wherein
a first alignment control blank pattern for controlling an alignment direction of the liquid crystal molecules of the liquid crystal layer is formed on the first pixel electrode or the opposed electrode in the second partial region,
a second alignment control blank pattern for controlling an alignment direction of the liquid crystal molecules of the liquid crystal layer is formed on the second pixel electrode or the opposed electrode in the fourth partial region, and
said plurality of electric field control blank patterns are formed, crossing the first alignment control blank pattern vertically.

7. A liquid crystal display according to claim 5, wherein
the first substrate further includes a third pixel electrode,
a thickness of the liquid crystal layer on the third pixel electrode in the third pixel region is larger than a thickness of the liquid crystal layer in the first pixel region,
the third pixel region includes a fifth partial region, and a sixth partial region where a threshold voltage is higher than in the fifth partial region,
a third electric field control structure for controlling an electric field to be applied to the liquid crystal molecules of the liquid crystal layer is formed on the first substrate or the second substrate in the sixth partial region,
a plurality of other electric field control blank patterns for controlling an electric field to be applied to the liquid crystal molecules of the liquid crystal layer are formed on the third pixel electrode or the opposed electrode in the sixth partial region, and
a width or a pitch of said other electric field control blank pattern is different from a width or a pitch of said electric field control blank pattern.

8. A liquid crystal display according to claim 5, wherein
the first substrate further includes a third pixel electrode,
a thickness of the liquid crystal layer in a third pixel region on the third pixel electrode is equal to a thickness of the liquid crystal layer in the first pixel region,
the third pixel region includes a fifth partial region, and a sixth partial region where a threshold voltage is higher than in the fifth partial region,
a third electric field control structure for controlling an electric field to be applied to the liquid crystal molecules of the liquid crystal layer is formed on the first substrate or the second substrate in the sixth partial region,
a plurality of other electric field control blank patterns for controlling an electric field to be applied to the liquid crystal molecules of the liquid crystal layer are formed on the third pixel electrode or the opposed electrode in the sixth partial region, and
a width or a pitch of said other electric field control blank pattern is equal to a width or a pitch of said electric field control blank pattern.

9. A liquid crystal display according to claim 4, wherein
the first pixel region is a pixel region for displaying green color,
the second pixel region is a pixel region for displaying blue color, and
the third pixel region is a pixel region for displaying red color.

10. A liquid crystal display according to claim 7, wherein
the first pixel region is a pixel region for displaying green color,
the second pixel region is a pixel region for displaying blue color, and
the third pixel region is a pixel region for displaying red color.

11. A liquid crystal display according to claim 8, wherein
the first pixel region is a pixel region for displaying green color,
the second pixel region is a pixel region for displaying blue color, and
the third pixel region is a pixel region for displaying red color.

12. A liquid crystal display according to claim 1, wherein the liquid crystal layer is formed of a liquid crystal having negative dielectric anisotropy.

13. A liquid crystal display according to claim 5, wherein the liquid crystal layer is formed of a liquid crystal having negative dielectric anisotropy.

* * * * *